US012606295B2

(12) United States Patent
Block et al.

(10) Patent No.: US 12,606,295 B2
(45) Date of Patent: Apr. 21, 2026

(54) AIRCRAFT WINGS AND SYSTEMS AND METHODS FOR DRIVING A SLAT OF AN AIRCRAFT WING

(71) Applicant: The Boeing Company, Arlington, VA (US)

(72) Inventors: Samuel L. Block, Bothell, WA (US); Gregory Santini, Bothell, WA (US); Ramon A. Burin, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/823,854

(22) Filed: Sep. 4, 2024

(65) Prior Publication Data

US 2026/0062115 A1      Mar. 5, 2026

(51) Int. Cl.
B64C 9/08           (2006.01)
(52) U.S. Cl.
CPC ..................................... B64C 9/08 (2013.01)
(58) Field of Classification Search
CPC .... B64C 9/02; B64C 9/06; B64C 9/22; B64C 9/24
See application file for complete search history.

(56) References Cited

U.S. PATENT DOCUMENTS

| | | | | |
|---|---|---|---|---|
| 3,556,439 | A | * | 1/1971 | Autry ......................... B64C 3/38 |
| | | | | 244/210 |
| 4,399,970 | A | | 8/1983 | Evans |

| | | | | |
|---|---|---|---|---|
| 4,650,140 | A | * | 3/1987 | Cole ......................... B64C 9/24 |
| | | | | 244/214 |
| 4,687,162 | A | | 8/1987 | Johnson et al. |
| 7,270,305 | B2 | | 9/2007 | Rampton et al. |
| 8,474,762 | B2 | | 7/2013 | Peirce |
| 10,618,644 | B2 | | 4/2020 | Gemilang et al. |
| 11,332,233 | B2 | | 5/2022 | Gibbert et al. |
| 2011/0036944 | A1 | * | 2/2011 | Mann ......................... B64C 9/22 |
| | | | | 244/99.3 |
| 2020/0017192 | A1 | * | 1/2020 | Gibbert ..................... B64C 9/24 |
| 2022/0348307 | A1 | * | 11/2022 | Schreck ..................... B64C 3/38 |
| 2024/0343383 | A1 | | 10/2024 | Rayner et al. |

FOREIGN PATENT DOCUMENTS

CN             113212734  B       2/2023

OTHER PUBLICATIONS

European Patent Office, Extended European Search Report , App. No. 25171315.2 (Jun. 20, 2025).

* cited by examiner

*Primary Examiner* — Magdalena Topolski
*Assistant Examiner* — Anna L. Gordon
(74) *Attorney, Agent, or Firm* — Walters & Wasylyna LLC

(57)                    ABSTRACT

A system for driving a slat of an aircraft wing includes a primary support, an auxiliary support, an actuator support, and an actuator. The primary support is rotationally coupled to the slat at a forward slat revolute joint for moving the slat between a retracted position and one or more extended positions. The auxiliary support is coupled to the slat for pivoting the slat about the forward slat revolute joint when the slat moves between the retracted position and the one or more extended positions. The actuator support is coupled to the slat. The actuator is coupled to the actuator support at an aft slat revolute joint for driving the slat between the retracted position and the one or more extended positions.

20 Claims, 20 Drawing Sheets

AIRCRAFT WINGS AND SYSTEMS AND METHODS FOR DRIVING A SLAT OF AN AIRCRAFT WING

GOVERNMENT RIGHTS

This invention was made with Government support under 80AFRC22N0008 awarded by NASA. The government has certain rights in the invention.

FIELD

The present disclosure relates generally to aircraft control surfaces and, more particularly, to systems and methods for driving and controlling motion of a slat of an aircraft wing between a retracted position and one or more extended positions.

BACKGROUND

Modern aircraft often use slat devices on the leading edge of the wing to modify the wing's effective chord and camber. This improves airplane performance during takeoff and landing without penalizing the cruise performance. In certain types of aircraft, the slat may utilize a trajectory that is a large distance, which results in long tracks that penetrate the front spar of the wing. In thin wings, slat stiffness, actuator location, and mechanism stiffness may combine in the thin wing loft to deflect and twist the slat out of the desired deployed position, which can result in an undesirable low speed position of the slat. Accordingly, those skilled in the art continue with research and development efforts related to driving and controlling motion of a slat of an aircraft wing.

SUMMARY

Disclosed are examples of a system for driving a slat of a wing of an aircraft, a wing of an aircraft, an aircraft, and a method for driving a slat of a wing of an aircraft. The following is a non-exhaustive list of examples, which may or may not be claimed, of the subject matter according to the present disclosure.

In an example, the disclosed system includes a primary support, an auxiliary support, an actuator support, and an actuator. The primary support is rotationally coupled to the slat at a forward slat revolute joint for moving the slat between a retracted position and one or more extended positions. The auxiliary support is coupled to the slat for pivoting the slat about the forward slat revolute joint when the slat moves between the retracted position and the one or more extended positions. The actuator support is coupled to the slat. The actuator is coupled to the actuator support at an aft slat revolute joint for driving the slat between the retracted position and the one or more extended positions.

In an example, the disclosed wing includes a leading edge, a frame, and a slat. The slat is movable relative to the leading edge. The wing also includes a primary support, an auxiliary support, an actuator support, and an actuator. The primary support is rotationally coupled to the slat at a forward slat revolute joint and rotationally coupled to the frame for moving the slat between a retracted position and one or more extended positions. The auxiliary support is coupled to the slat for pivoting the slat about the forward slat revolute joint when the slat moves between the retracted position and the one or more extended positions. The actuator support is coupled to the slat. The actuator coupled to the actuator support at an aft slat revolute joint for driving the slat between the retracted position and the extended position.

In an example, the disclosed aircraft includes a wing. The wing includes a leading edge, a frame, and a slat. The slat is movable relative to the leading edge of the wing. The aircraft also includes a primary support, an auxiliary support, an actuator support, and an actuator. The primary support is rotationally coupled to the slat at a forward slat revolute joint and rotationally coupled to the frame of the wing for moving the slat between a retracted position and one or more extended positions. The auxiliary support is coupled to the slat for pivoting the slat about the forward slat revolute joint when the slat moves between the retracted position and the one or more extended positions. The actuator support is coupled to the slat. The actuator coupled to the actuator support at an aft slat revolute joint for driving the slat between the retracted position and the extended position.

In an example, the disclosed method includes steps of: (1) actuating the slat between a retracted position and one or more extended positions using an actuator coupled to an actuator support at an aft slat revolute joint; (2) moving the slat relative to a leading edge of the wing between the retracted position and the one or more extended positions using a primary support that is rotationally coupled to the slat at a forward slat revolute joint; and (3) pivoting the slat about the forward slat revolute joint using an auxiliary support coupled to the slat when moving the slat between the retracted position and the extended position.

Other examples of the system, the wing, the aircraft, and the method will become apparent from the following detailed description, the accompanying drawings, and the appended claims.

DETAILED DESCRIPTION

Figure 1:
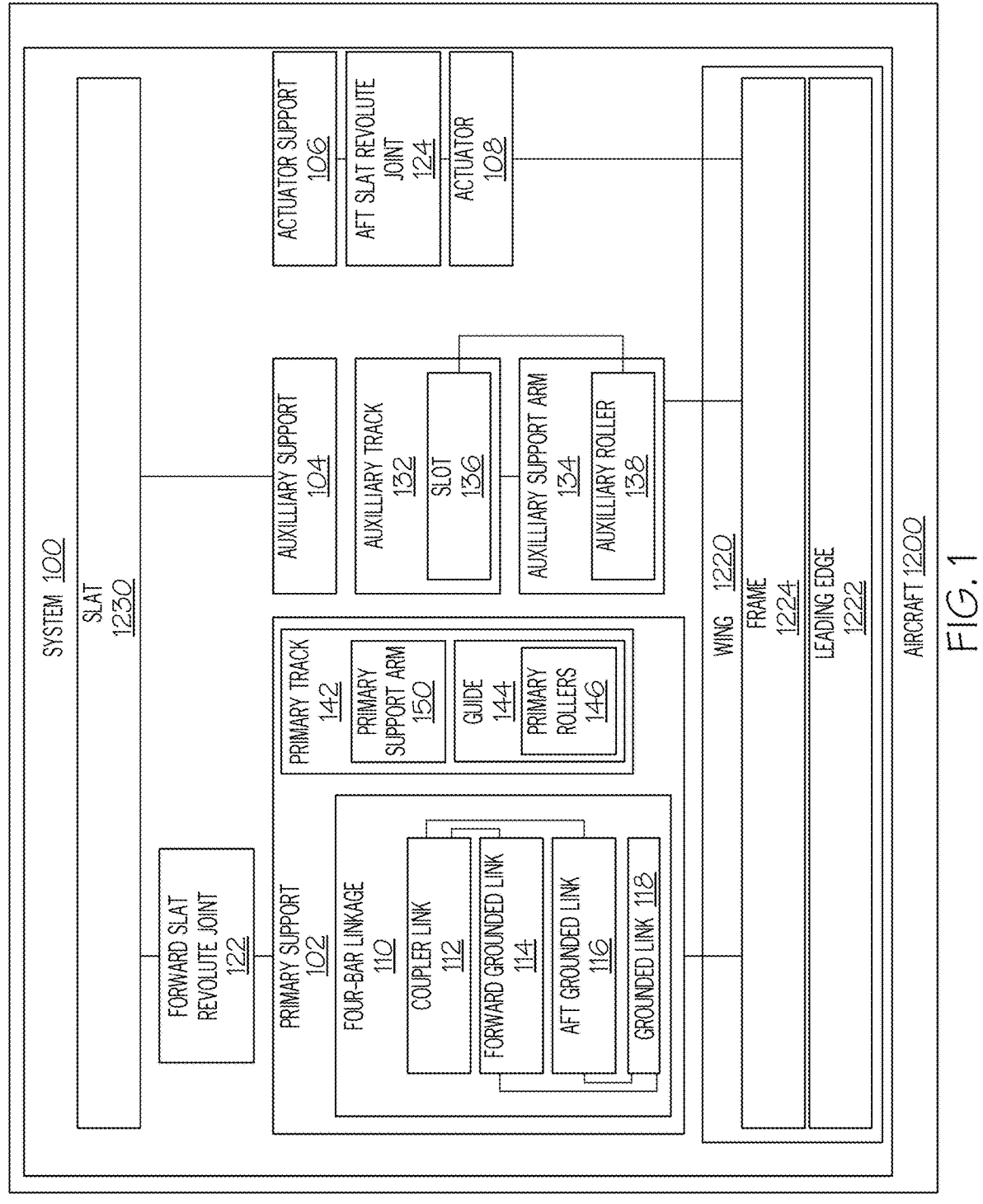
FIG. 1 is a schematic block diagram of an example of a system for driving a slat of an aircraft.

Referring generally to FIGS. 1-19, by way of examples, the present disclosure is directed to a system 100 and a method 1000 for moving (e.g., driving and controlling motion of) a slat 1230 of a wing 1220 of an aircraft 1200. Examples of the system 100 and method 1000 provide a new architecture for slat kinematics that substantially eliminates observed slat rollback and deflection issues, while not compromising system and structure integration in the leading edge of an aircraft wing and, more particularly, in an ultra-thin wing.

The present disclosure recognizes that in certain wing configurations, such as thin wings, the main support mechanisms of the slat are deflecting up and aft in the fully deployed position, which results in an undesirable slat position for low speeds. Causes of this issue include a combination of the actuator not located at the main supports, the flexibility of the slat, mechanism kinematics, and mechanism stiffness. Conventional slat mechanisms are "dual pivot," which refers to a first pivot axis as the slat rotation axis and a second pivot axis as the slat pivot axis. In these configurations, slat pitching about the pivot axis is controlled by tracks. The present disclosure also recognizes that the location of pivot axis is historically critical for slat stiffness and flutter performance, and a more forward pivot axis is typically better, and a more aft axis is typically worse. However, constraints of thin wing designs locate the slat pivot axis further aft, resulting in the observed slat rollback issue. The system 100 and method 1000 provide a unique architectural change to the slat kinematic configuration that resolves the rollback issue, while not penalizing slat systems and structures integration.

Examples of the system 100 and method 1000, disclosed herein, separate the actuator-to-slat attachment and the slat pivot axis, thereby locating the slat pivot axis further forward in the body of the slat while leaving the actuator attachment further aft in the cove of the wing. A third rotational joint is added in the slat, thereby resulting in a "triple pivot" configuration and slat architecture. Examples of the system 100 and method 1000 resolve observed issues in the slat rollback deflecting or twisting in thin wings by locating the slat pivot axis as far forward as possible, thereby enabled by unchanged actuator integration in the thicker part of leading-edge cove. Particular benefits of the system 100 and method 1000 include resolving slat rollback issues in thin wings by locating the slat pivot axis as far forward as possible, enabling unchanged actuator integration in a thicker part of the leading-edge cove of the wing.

Referring now to FIGS. 1 and 3-19, the following are examples of the system 100, according to the present disclosure. Examples of the system 100 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

FIG. 1 illustrates an example of the aircraft 1200, the wing 1220, and the system 100 for moving the slat 1230 between the retracted (e.g., stowed) position and one or more extended (e.g., deployed) positions. In one or more examples, the system 100 includes a primary support 102, an auxiliary support 104, an actuator support 106, and an actuator 108. As will be described in more detail herein, the primary support 102 and the auxiliary support 104 control motion or define the movement path of the slats 1230 between the retracted and extended positions. The actuator 108 drives motion of the slats 1230 between the retracted and extended positions.

Figure 3:
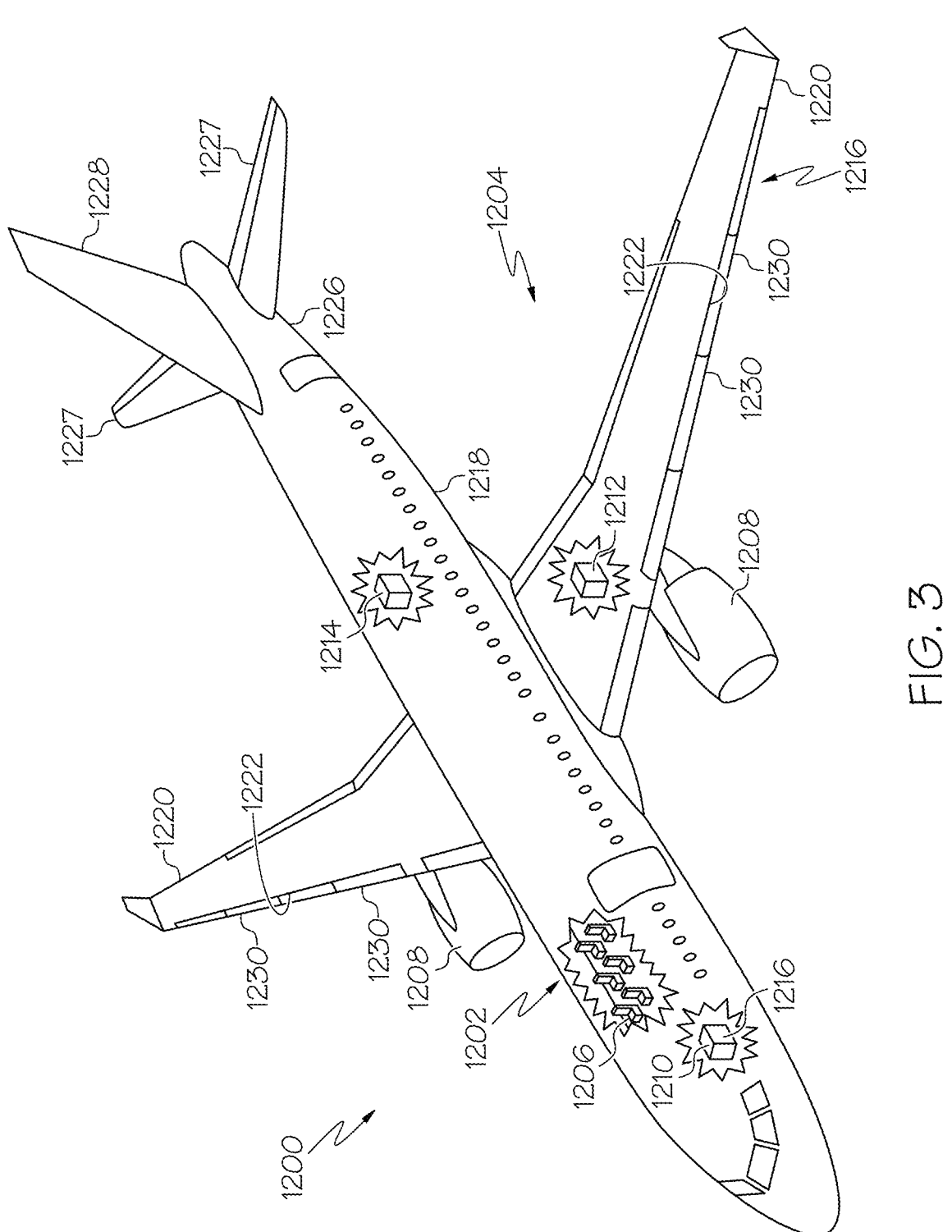
FIG. 3 is a schematic illustration of an example of an aircraft.

FIG. 3 illustrates an example of the aircraft 1200. The aircraft 1200 includes a body 1218 (e.g., fuselage) and a pair of wings 1220 attached to the body 1218. The aircraft 1200 also includes a propulsion system 1208, such as engines coupled to the wings 1220. In one or more examples, the body 1218 includes a tail section 1226. A pair of horizontal stabilizers 1227 and a vertical stabilizer 1228 are coupled to the tail section 1226 of body 1218. The aircraft 1200 includes one or more instances of the slat 1230 located along or coupled to a portion of the leading edge 1222 of the wing 1220. The aircraft 1200 includes or utilizes the system 100 and method 1000 for moving the slat 1230 between the retracted position and one or more extended or deployed positions.

Figure 4:
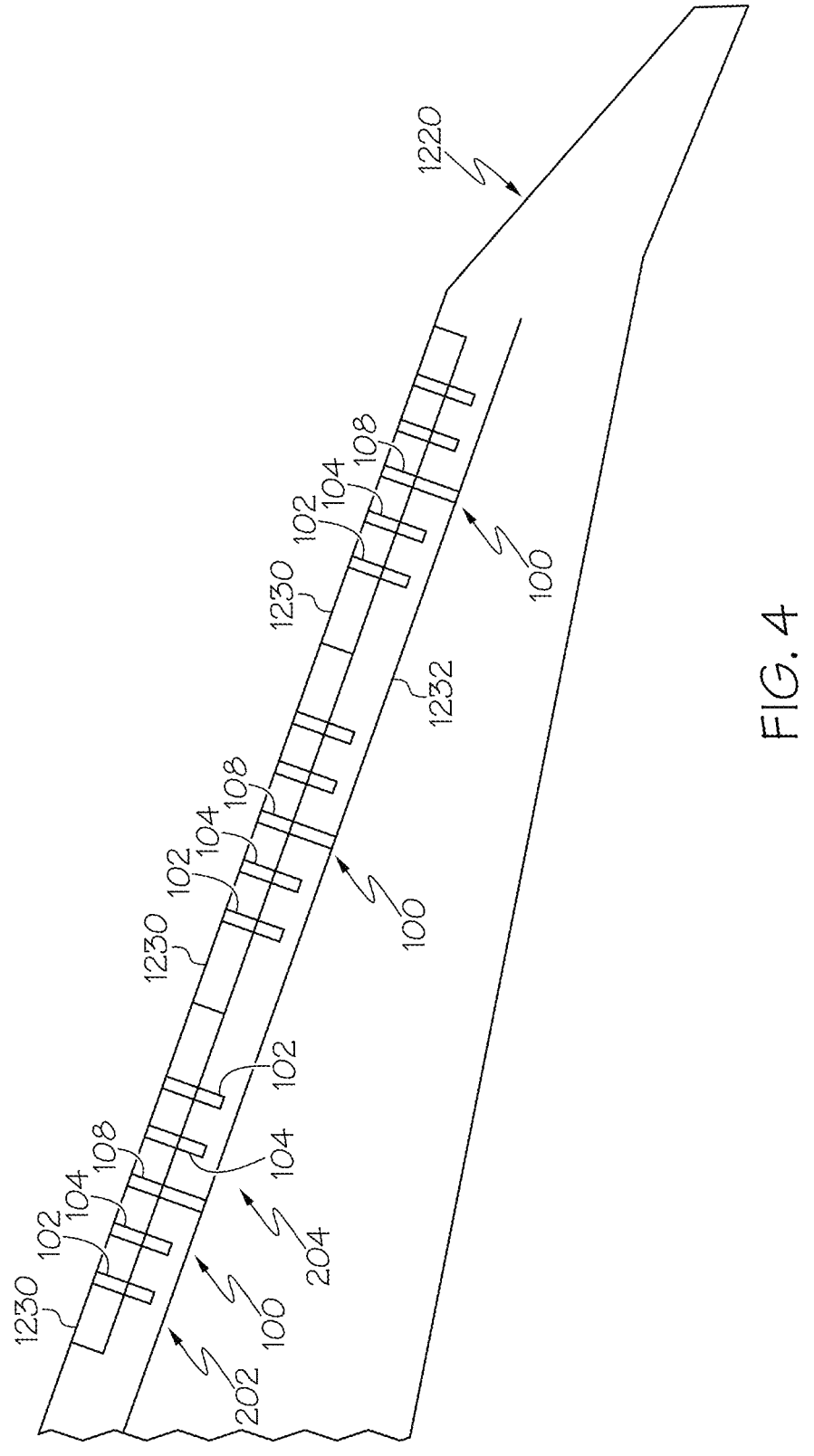
FIG. 4 is a schematic illustration of an example of a portion of a wing of an aircraft.

FIG. 4 illustrates an example of the wing 1220. The wing 1220 includes one or more instances of the slat 1230. Each instance of the slat 1230 is located along, is coupled to, and is movable relative to the leading edge 1222 of the wing 1220. The wing 1220 includes or utilizes the system 100 and method 1000 for moving the slat 1230 between the retracted position and one or more extended or deployed positions.

As illustrated in FIG. 4, in one or more examples, the wing 1220 includes a number of (e.g., one or more) instances of the system 100. The system 100 includes a number of (e.g., one or more) instances of the primary support 102. Each primary support 102 is coupled to the slat 1230 and is configured for controlling motion of the slat 1230. In one or more examples, the system 100 includes a number of instances of the auxiliary support 104. Each auxiliary support 104 is coupled to the slat 1230 and is configured for controlling motion of the slat 1230. In one or more examples, the system 100 includes a number of instances of the actuator 108. Each actuator 108 is coupled to the slat 1230 and is configured for driving motion of the slat 1230.

In one or more examples, the wing 1220 includes a frame 1224. The frame 1224 forms the underlying support structure for the wing 1220. In various examples, wing skins are coupled to the frame 1224. In one or more examples, the frame 1224 includes a number of (e.g., one or more) spars 1232. A forward most one of the spars 1232 (e.g., front spar) is illustrated by example in FIG. 4. In one or more examples, components of the system 100 are positioned in the leading-edge cove of the wing 1220 forward of the spars 1232. In one or more examples, the frame 1224 includes a number of ribs 1234. In one or more examples, components of the system 100 are coupled to the ribs 1234.

Figure 5:
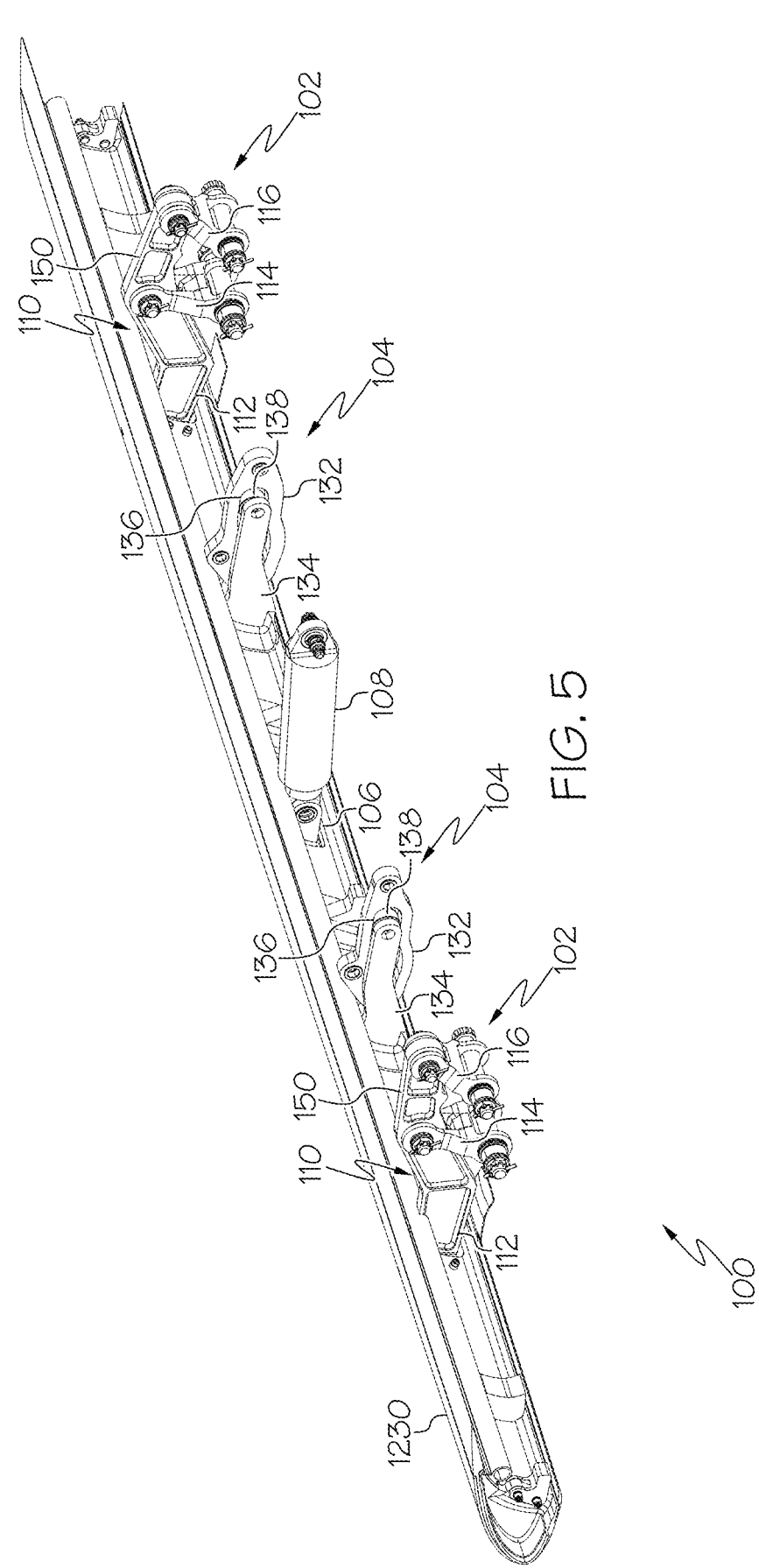
FIG. 5 is a schematic, perspective illustration of an example of the system and the slat.

FIG. 5 illustrates an example of the system 100 coupled to the slat 1230. In FIG. 5, certain elements and components of the wing 1220 and the frame 1224 have been omitted for clarity. In the illustrated example, the system 100 includes two instances of the primary support 102, which are spaced apart from each other. Each primary support 102 is coupled to the slat 1230. The system 100 includes two instances of the auxiliary support 104, which are spaced apart from each other and located between the two instances of the primary support 102. Each auxiliary support 104 is coupled to the slat 1230. The system 100 includes one instance of the actuator 108, which is located between the two instances of the auxiliary support 104. The auxiliary support 104 is coupled to the slat 1230.

Figure 6:
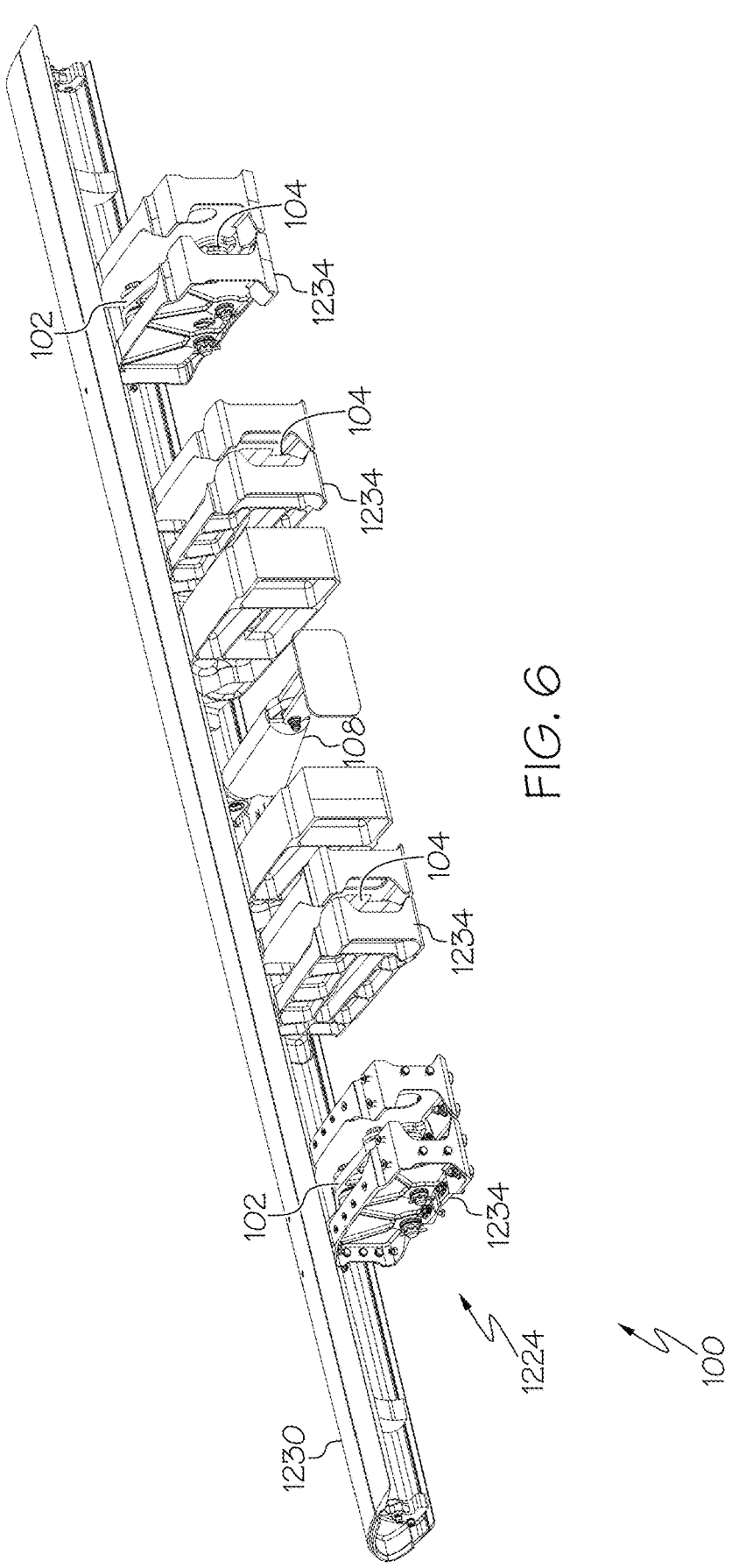
FIG. 6 is a schematic, perspective illustration of an example of the system, the slat, and a portion of a frame of the wing.

FIG. 6 illustrates another example of the system 100 coupled to the slat 1230. In FIG. 6, certain elements and components of the wing 1220 and the frame 1224 have been omitted for clarity and other elements and components of the frame 1224, such as ribs 1234, are illustrated. In one or more examples, each instance of the primary support 102 is coupled to (e.g., between) a corresponding set of the ribs 1234. In these examples, a set of ribs 1234 includes a pair of ribs 1234. In one or more examples, each instance of the auxiliary support 104 is coupled to (e.g., between) a corresponding set of the ribs 1234. In FIG. 6, the primary support 102 and the auxiliary support 104 are obscured by their associated pairs of ribs 1234.

Figure 7:
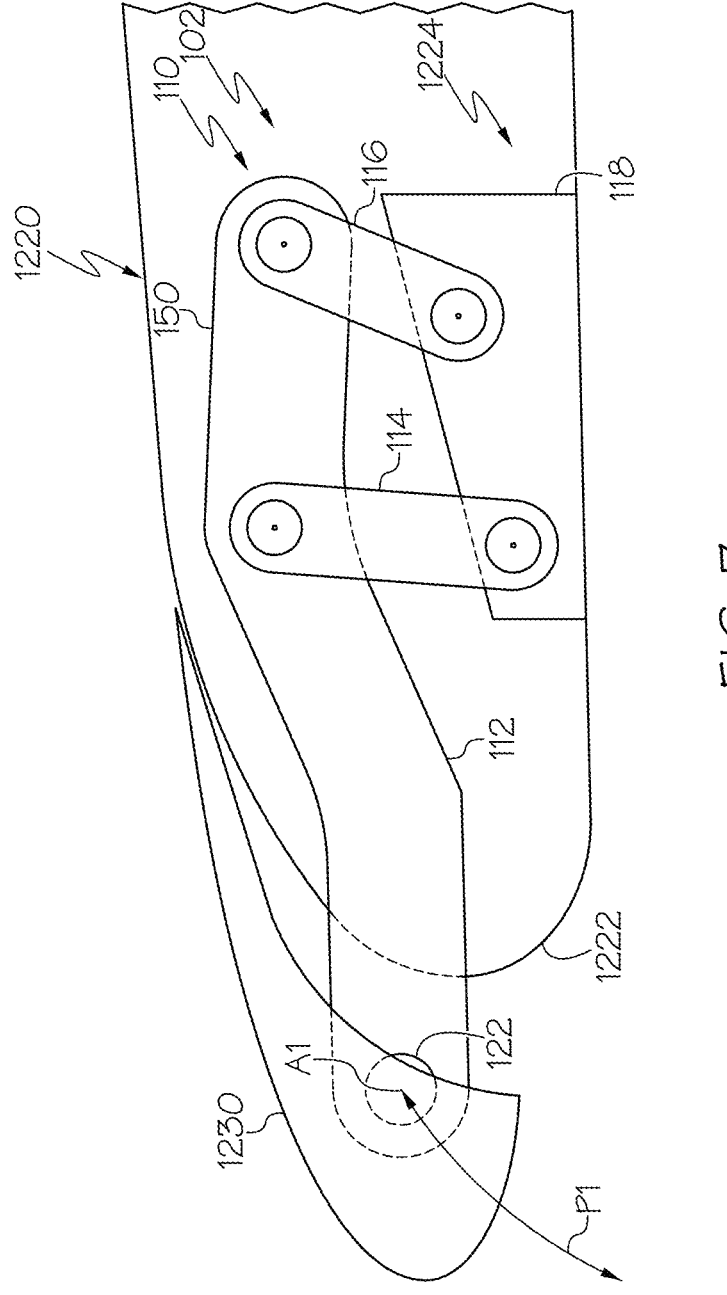
FIG. 7 is a schematic, elevation illustration of an example of a primary support of the system in a retracted position.
Figure 8:
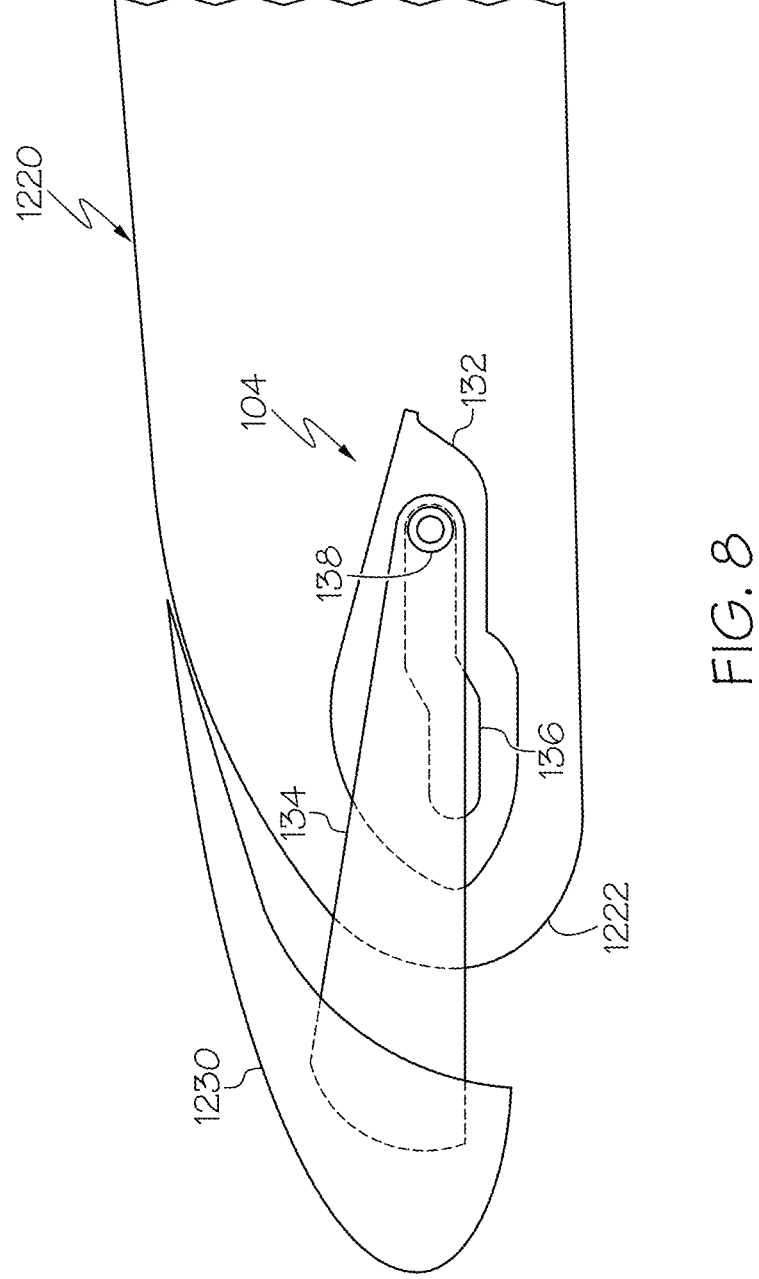
FIG. 8 is a schematic, elevation illustration of an example of an auxiliary support of the system in the retracted position.
Figure 9:
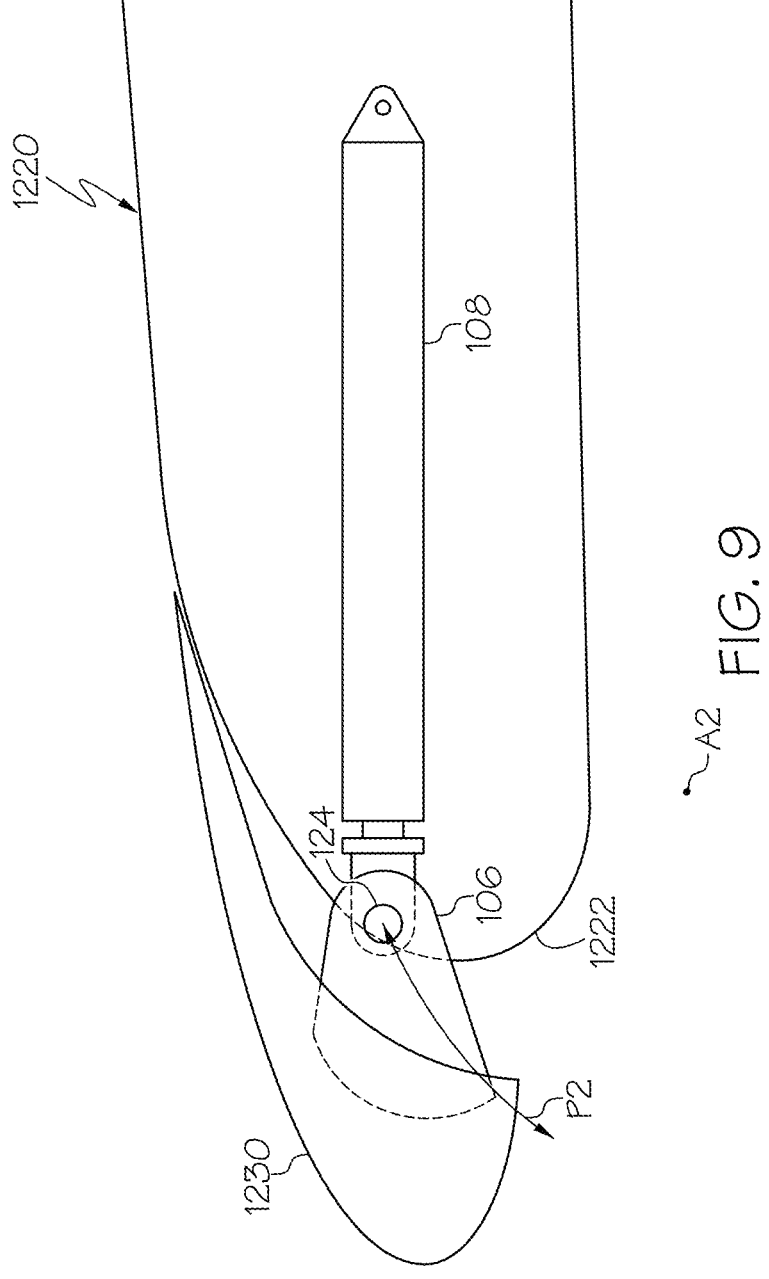
FIG. 9 is a schematic, elevation illustration of an example of an actuator of the system in the retracted position.
Figure 10:
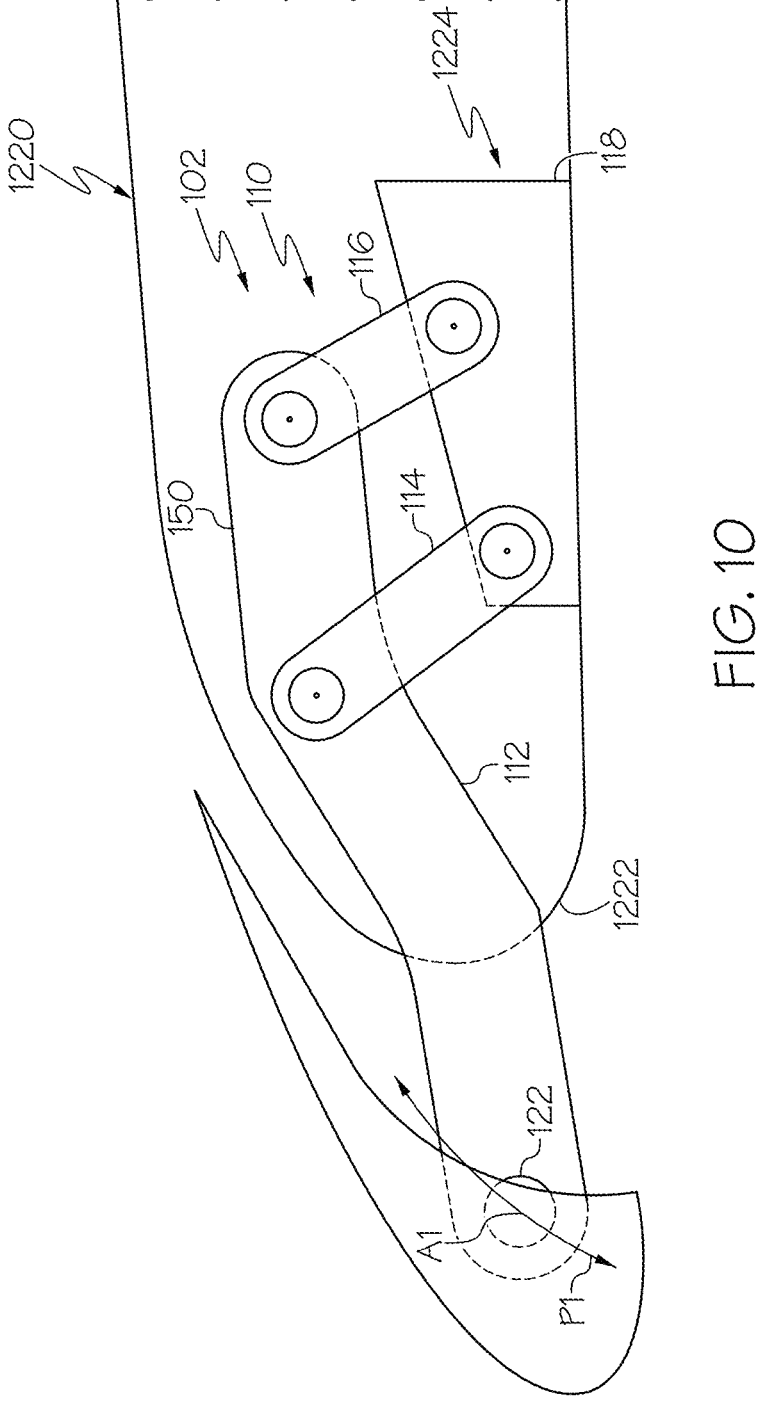
FIG. 10 is a schematic, elevation illustration of an example of the primary support of the system in an intermediate position.
Figure 11:
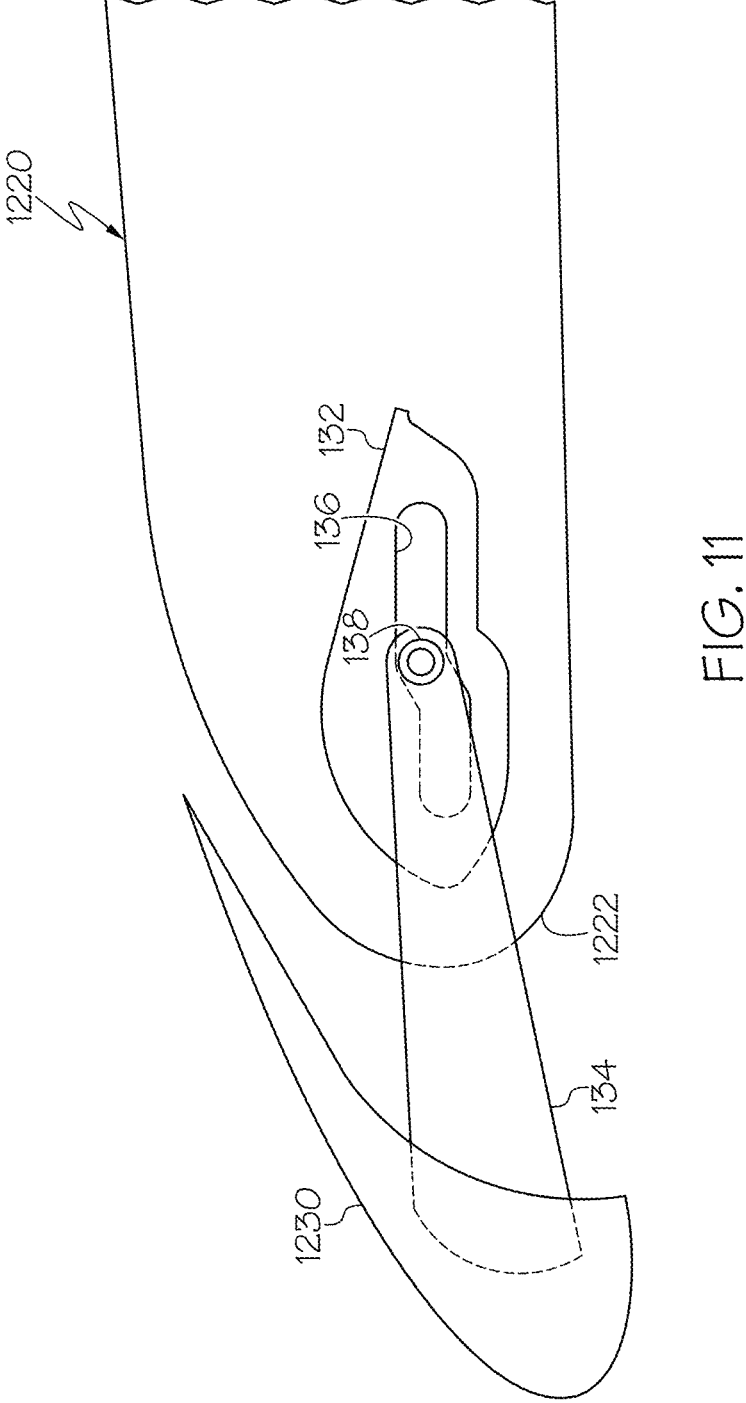
FIG. 11 is a schematic, elevation illustration of an example of the auxiliary support of the system in the intermediate position.
Figure 12:
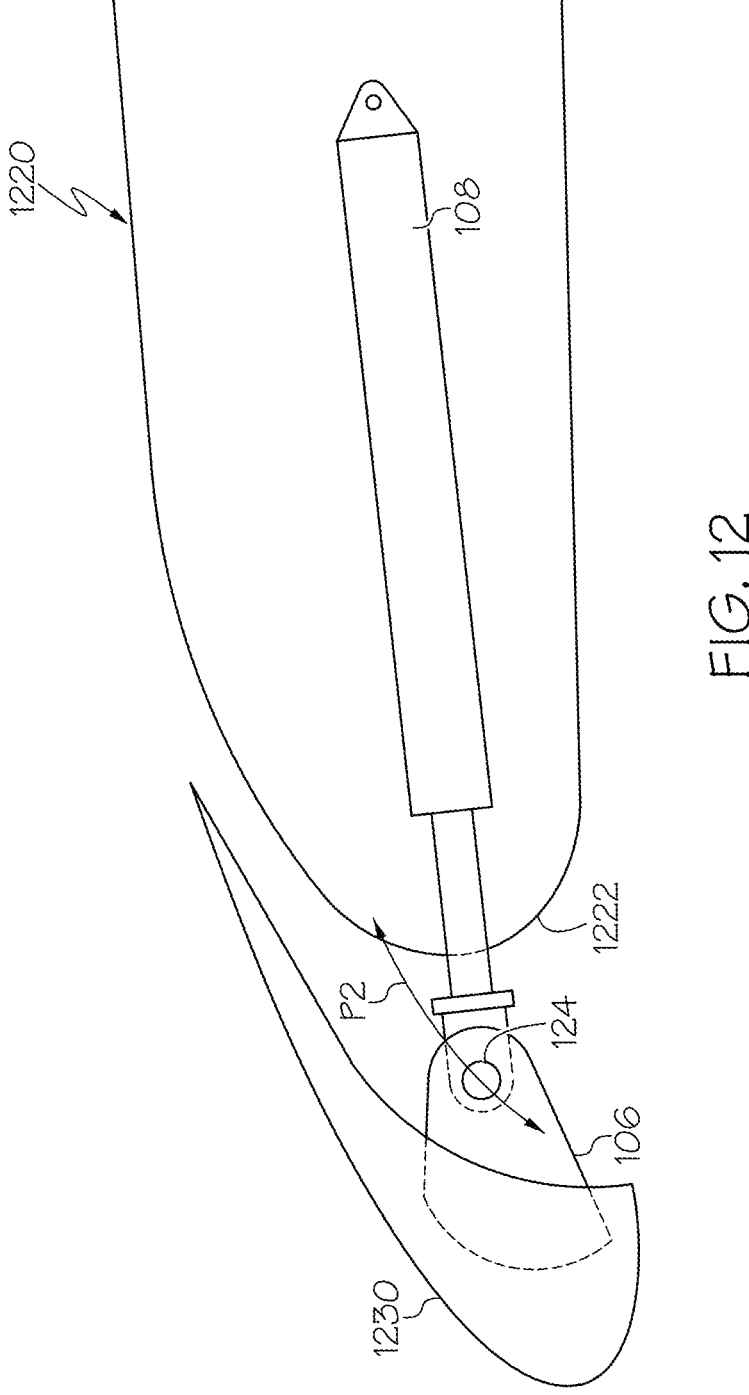
FIG. 12 is a schematic, elevation illustration of an example of the actuator of the system in the intermediate position.
Figure 13:
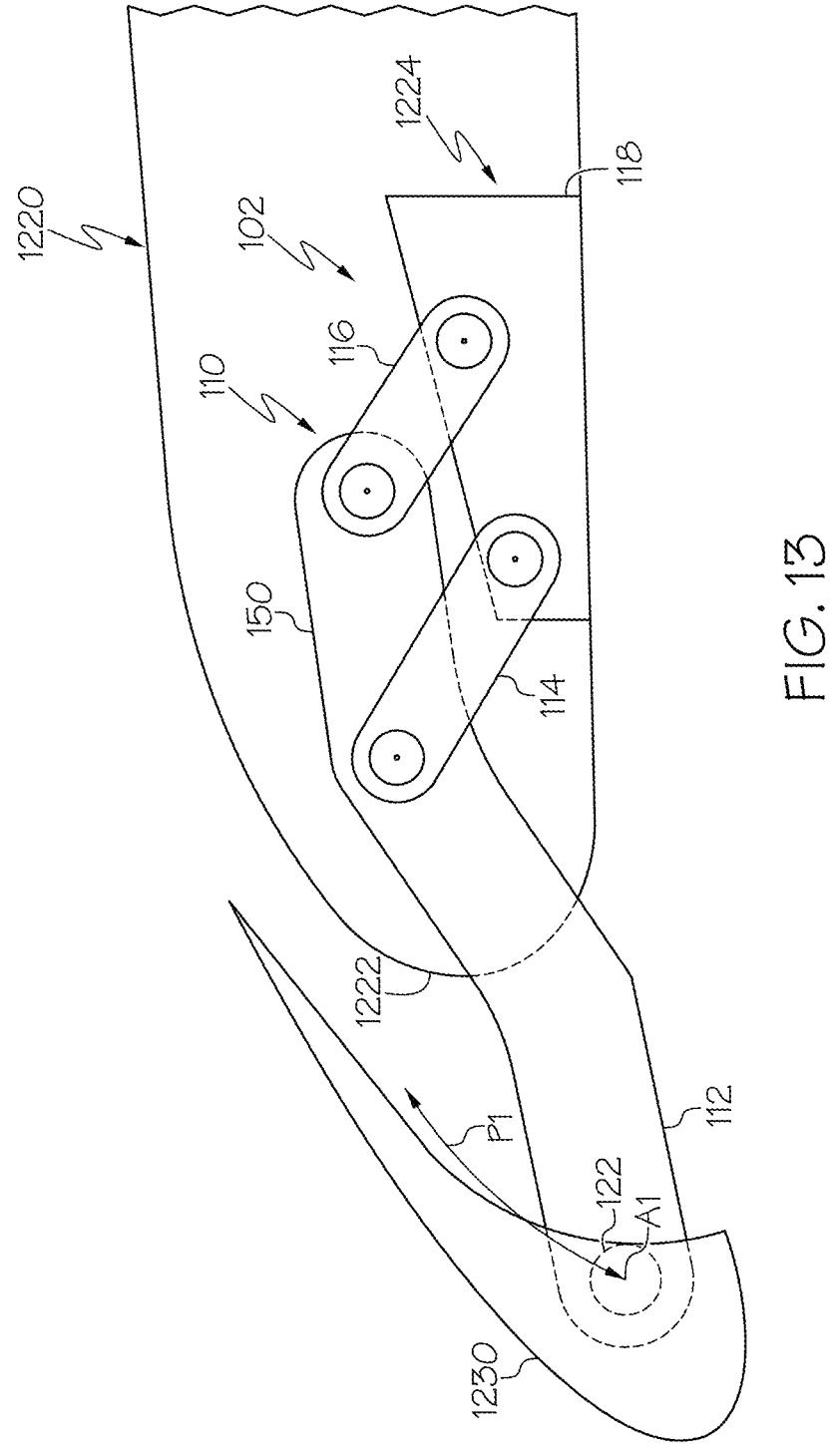
FIG. 13 is a schematic, elevation illustration of an example of the primary support of the system in an extended position.
Figure 14:
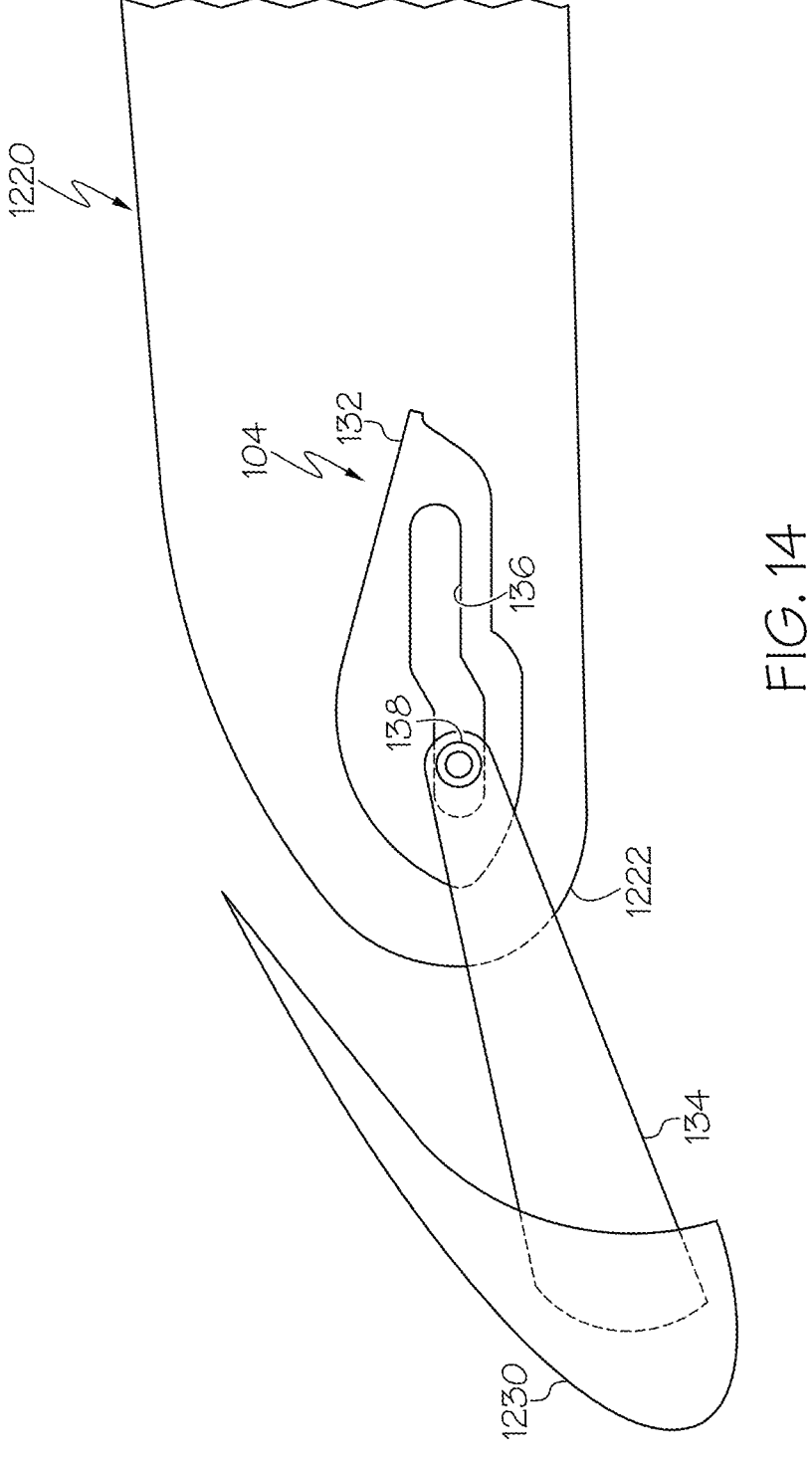
FIG. 14 is a schematic, elevation illustration of an example of the auxiliary support of the system in the extended position.
Figure 15:
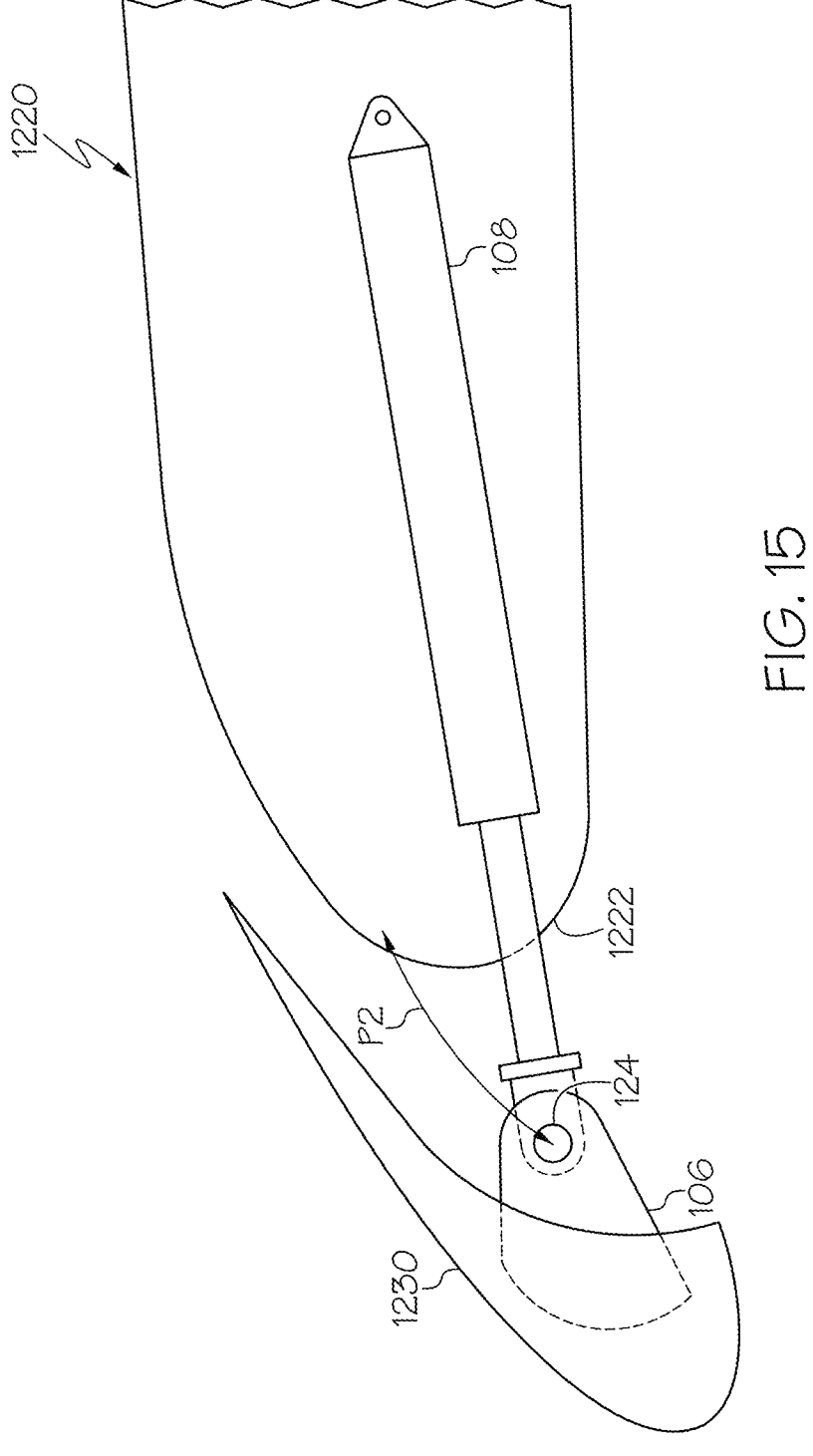
FIG. 15 is a schematic, elevation illustration of an example of the actuator of the system in the extended position.

FIGS. 7-9 illustrate examples of the system 100 in the retracted position. In one or more examples, the illustrated retracted position is an example of a fully stowed position or a cruise position of the slat 1230. FIGS. 10-12 illustrate examples of the system 100 in one of the extended positions. In one or more examples, the illustrated extended position is an example of a partially deployed position, an intermediate position, or a takeoff position of the slat 1230. FIGS. 13-15 illustrate examples of the system 100 in one of the extended positions. In one or more examples, the illustrated extended position is an example of a fully deployed position or a landing position of the slat 1230. FIGS. 7, 10 and 13 illustrate examples of the primary support 102 of the system 100. FIGS. 8, 11 and 14 illustrate examples of the auxiliary support 104 of the system 100. FIGS. 9, 12 and 15 illustrate examples of the actuator 108 of the system 100.

Figure 16:
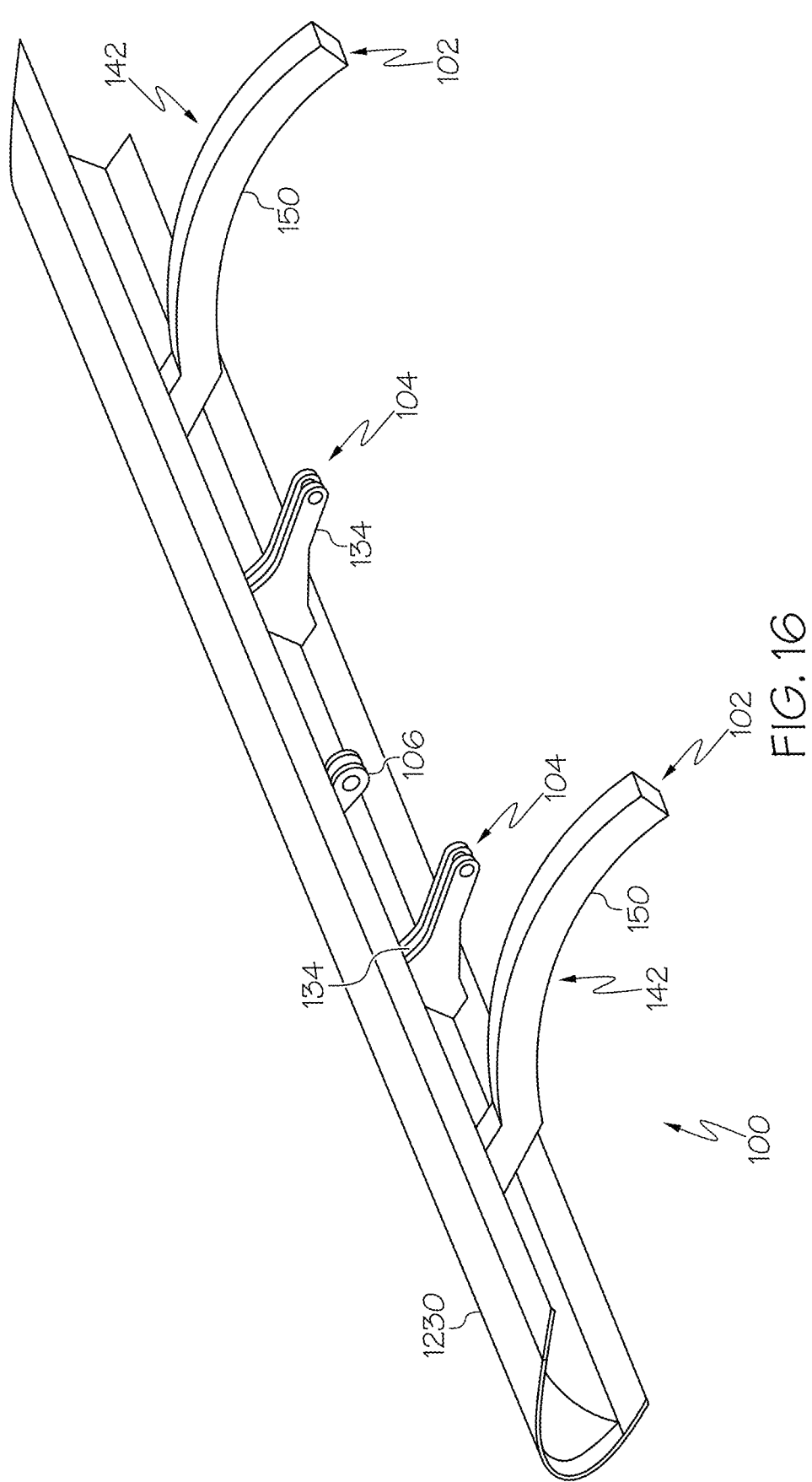
FIG. 16 is a schematic, perspective illustration of an example of a portion of the system and the slat.

FIG. 16 illustrates another example of the system 100 coupled to the slat 1230. In FIG. 16, certain elements and components of the wing 1220 and the frame 1224 have been omitted for clarity. In the illustrated example, the system 100 includes two instances of the primary support 102, which are spaced apart from each other. Each primary support 102 is coupled to the slat 1230. The system 100 includes two instances of the auxiliary support 104, which are spaced apart from each other and located between the two instances of the primary support 102. Each auxiliary support 104 is coupled to the slat 1230. The system 100 includes one instance of the actuator 108 (not shown in FIG. 16), which is located between the two instances of the auxiliary support 104. The auxiliary support 104 is coupled to the slat 1230.

Figure 17:
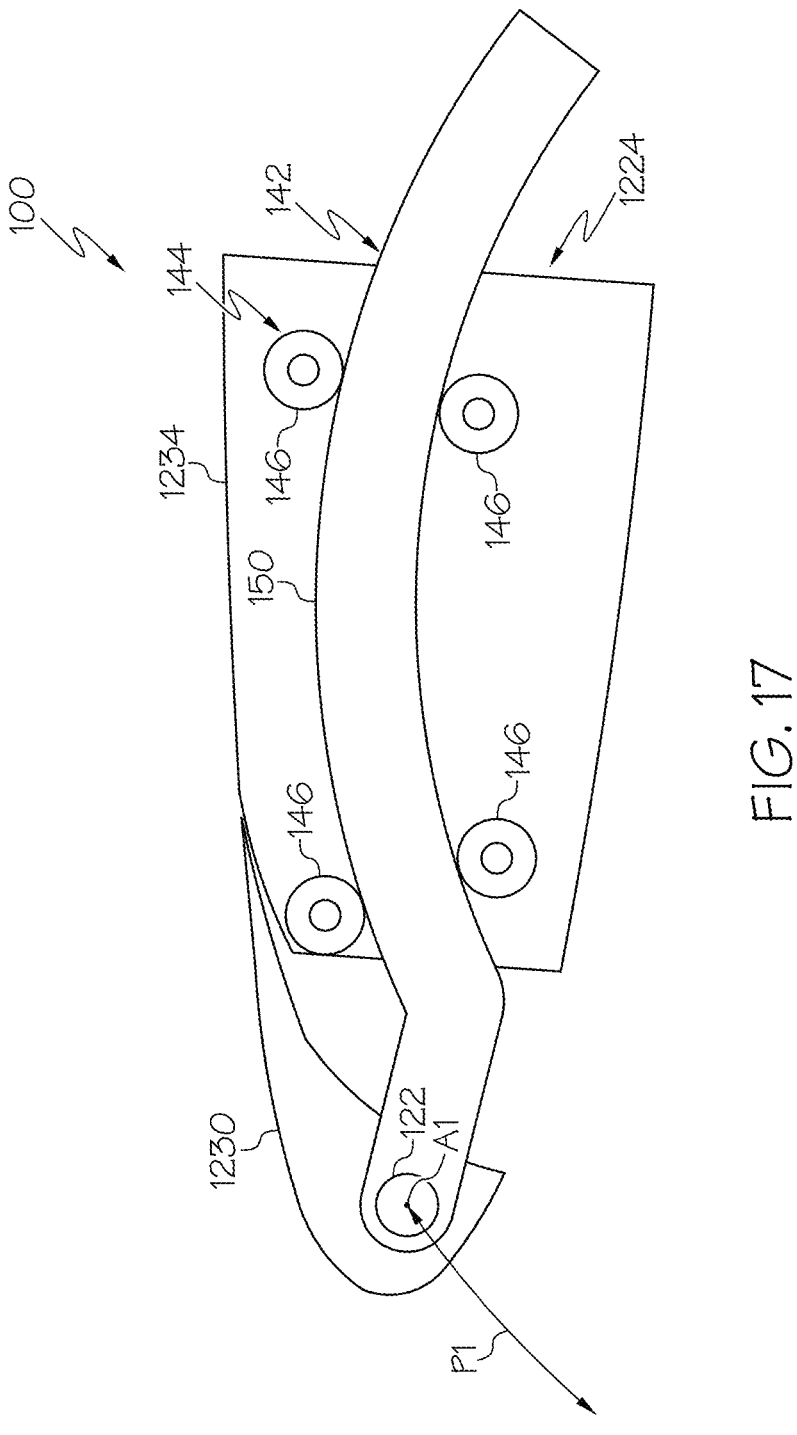
FIG. 17 is a schematic, elevation illustration of an example of the primary support of the system in a retracted position.

FIG. 17 illustrates an example of the primary support 102 of the system 100 shown in FIG. 16 in a retracted position.

Figure 18:
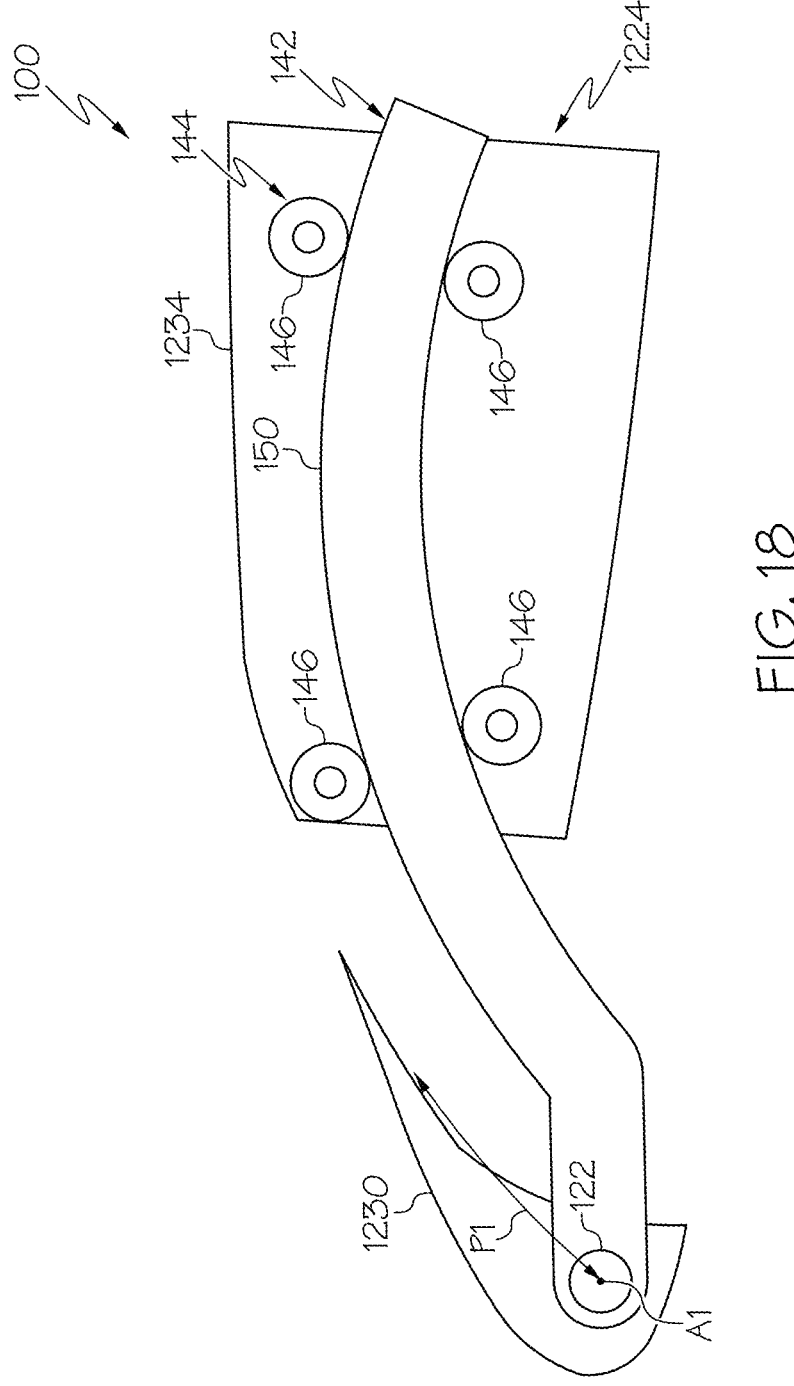
FIG. 18 is a schematic, elevation illustration of an example of the primary support of the system in an extended position.
Figure 19:
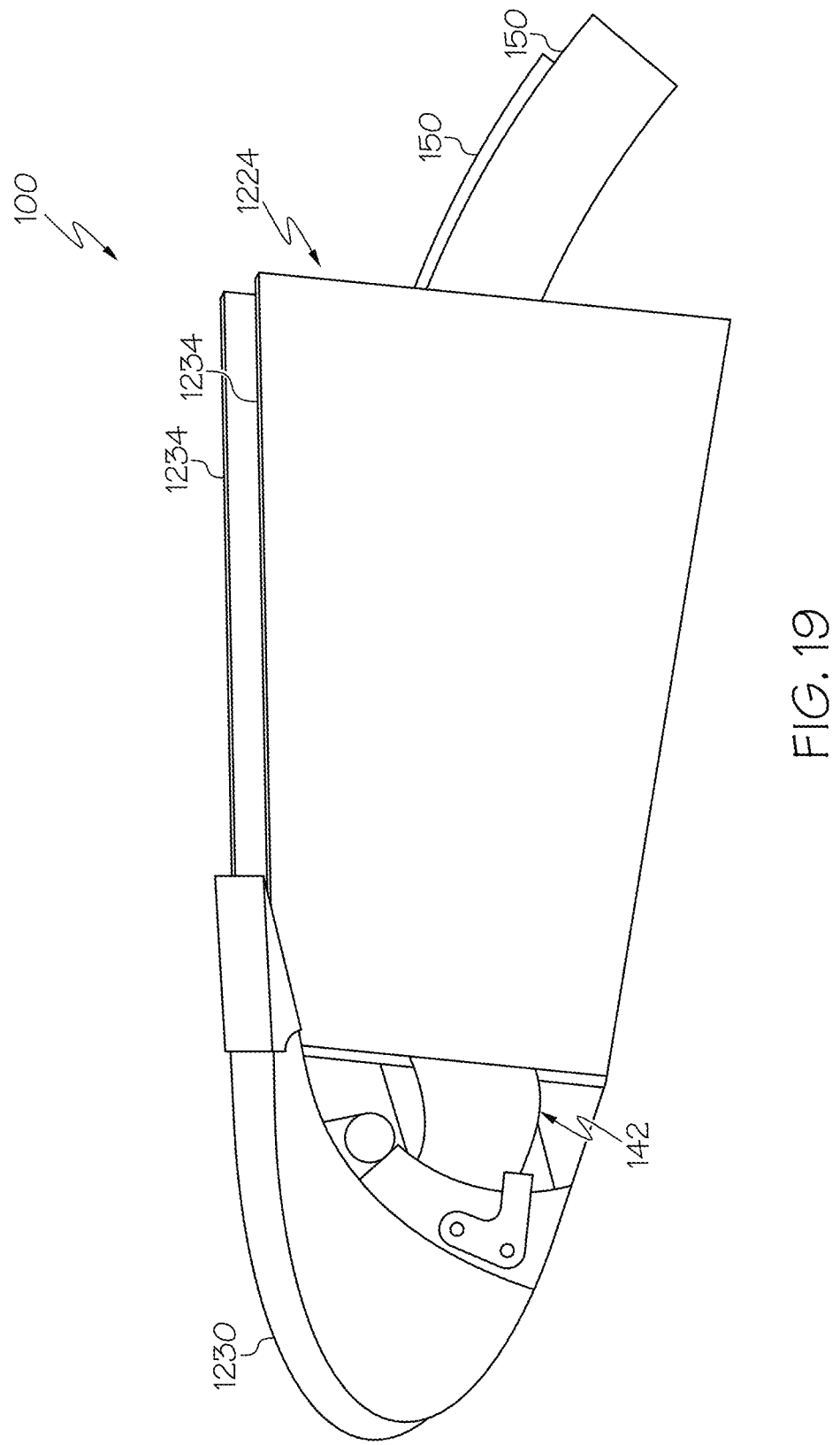
FIG. 19 is a schematic elevation view of an example of the system, the slat, and a portion of the frame of the wing.

FIG. 18 illustrates an example of the primary support 102 of the system 100 shown in FIG. 16 in one of the extended positions. FIG. 19 illustrates an example of the system 100 shown in FIG. 16 with certain components of the frame 1224 of the wing 1220 shown.

As illustrated in FIGS. 1, 5, 6, 7, 10, 13 and 16-19, in one or more examples, the primary support 102 is rotationally coupled to the slat 1230 at a forward slat revolute joint 122. The primary support 102 is configured for moving the slat 1230 between a retracted position and one or more extended positions.

As illustrated in FIGS. 1, 5, 7, 10 and 13, in one or more examples, the primary support 102 includes or takes the form of a four-bar linkage 110. The four-bar linkage 110 is rotationally coupled to the slat 1230 at the forward slat revolute joint 122. The four-bar linkage 110 is configured for moving the slat 1230 between a retracted position and one or more extended positions.

As illustrated in FIGS. 1 and 16-19, in one or more examples, the primary support 102 includes or takes the form of a primary track 142. The primary track 142 is rotationally coupled to the slat 1230 at the forward slat revolute joint 122. The primary track 142 is configured for moving the slat 1230 between a retracted position and one or more extended positions.

As illustrated in FIGS. 1, 5, 8, 11 and 14, in one or more examples, the auxiliary support 104 is coupled to the slat 1230. The auxiliary support 104 is configured for pivoting the slat 1230 about the forward slat revolute joint 122 (e.g., relative to the primary support 102) when the slat 1230 moves between the retracted position and the one or more extended positions.

As illustrated in FIGS. 1, 5, 9, 12 and 15, in one or more examples, the actuator support 106 is coupled to the slat 1230. The actuator 108 is coupled to the actuator support 106 at an aft slat revolute joint 124. The actuator support 106 is configured for driving the slat 1230 between the retracted position and the one or more extended positions. The actuator 108 can include or take the form of any suitable type of actuation mechanism, such as a linear actuator or a rotary actuator. In one or more examples, the aft slat revolute joint 124 is a ball joint or a universal joint. In other examples, the aft slat revolute joint 124 is a pin joint or other rotational connection.

As illustrated in FIGS. 7, 10 and 13, in one or more examples in which the primary support 102 takes the form of the four-bar linkage 110, the slat rotation axis is the instantaneous center of rotation (ICOR) of the main mechanism arm (e.g., primary support arm 150) of the four-bar linkage 110 (e.g., coupler link 112). In these examples, the instantaneous center (IC) is a point on a rigid body that has zero velocity, about which the body appears to rotate about for a given instant. In other words, all points on the body will appear to travel in a circular motion about this point.

As illustrated in FIGS. 17 and 18, in one or more examples in which the primary support 102 takes the form of the primary track 142, the slat rotation axis is the instantaneous center of rotation (ICOR) or virtual center of the curved main mechanism arm of the primary track (e.g., primary support arm 150).

For the purpose of the present disclosure, items being "rotationally coupled" to one another refers to a first item being coupled to the second item and the first item being rotatable relative to the second item. Similarly, for the purpose of the present disclosure, items being "pivotally coupled" to one another refers to a first item being coupled to the second item and the first item being pivotable relative to the second item.

As illustrated in FIGS. 7, 9, 10, 12, 13, 15, 17 and 18, in one or more examples, the forward slat revolute joint 122 (FIGS. 7, 10, 13, 17 and 18) is positioned forward of the aft slat revolute joint 124 (FIGS. 9, 12 and 15). Separating the forward slat revolute joint 122 and the aft slat revolute joint 124, locating the forward slat revolute joint 122 further forward (e.g., in the body of the slat 1230), and locating the aft slat revolute joint 124 further aft (e.g., in the leading edge cove of the wing 1220) facilitates superior actuation integration at the aft slat revolute joint 124 and provides the aft slat revolute joint 124 with a new three-dimensional rotational component about a corresponding instantaneous center of rotation (e.g., axis A2 in FIG. 9).

For the purpose of the present disclosure, the terms forward and aft refer to location, position, and/or direction relative to a fixed point on the aircraft 1200. In some cases, the terms forward and aft may refer to relative directions of movement.

As illustrated in FIGS. 7, 10, 13, 17 and 18, in one or more examples, the forward slat revolute joint 122 is located in the slat 1230. As illustrated in FIGS. 9, 12 and 15, in one or more examples, at least a portion of the aft slat revolute joint 124 is located in the wing 1220 at least when the slat 1230 is in the retracted position. In some examples, the aft slat revolute joint 124 is located in the wing 1220 when the slat 1230 is in one or more of the extended positions.

As illustrated in FIGS. 7, 10, 13, 17 and 18, in one or more examples, the forward slat revolute joint 122 has a forward slat pivot axis A1. In one or more examples, the forward slat pivot axis A1 passes through the slat 1230 and the four-bar linkage 110 (FIGS. 7, 10 and 13). In one or more examples, the forward slat pivot axis A1 passes through the slat 1230 and the primary track 142 (FIGS. 17 and 18). In one or more examples, the slat 1230 rotates about the forward slat pivot axis A1 relative to the main mechanism arm primary support arm 150 of the primary support 102 (e.g., the coupler link 112 of the four-bar linkage 110 or the primary track 142) when the slat 1230 moves between the retracted and extended positions.

As illustrated in FIGS. 9, 12 and 15, in one or more examples, the aft slat revolute joint 124 follows an aft arcuate path P2 about axis A2. In one or more examples, axis A2 is an instantaneous center of rotation and is located in space below the wing 1220. In one or more examples, the aft slat revolute joint 124 is located forward of axis A2.

As illustrated in FIGS. 7, 9, 10, 12, 13 and 15, in one or more examples, the forward slat pivot axis A1 is positioned forward of axis A2. The relative positions of the forward slat pivot axis A1 and axis A2 facilitate the forward slat revolute joint 122 being located forward of the aft slat revolute joint 124.

As illustrated in FIGS. 7, 10, 13, 17 and 18, in one or more examples, the forward slat revolute joint 122 (or the forward slat pivot axis A1) moves along a forward arcuate path P1 when the slat 1230 moves between the retracted position and the one or more extended positions. In one or more examples, the forward slat revolute joint 122 (or the forward slat pivot axis A1) rotates about the instantaneous center of rotation of the four-bar linkage 110, which defines the forward arcuate path P1 (e.g., FIGS. 7, 10 and 13). In one or more examples, the forward slat revolute joint (or forward slat pivot axis A1) is centered and rotates about the slat rotation axis (e.g., center of the arc formed by the primary track 142), which defines the forward arcuate path P1 (e.g., FIGS. 17 and 18).

As illustrated in FIGS. 9, 12 and 15, in one or more examples, the aft slat revolute joint 124 moves along the aft arcuate path P2 when the slat 1230 moves between the retracted position and the one or more extended positions. In one or more examples, the aft slat revolute joint 124 rotates about axis A2, which defines the aft arcuate path P2.

As illustrated in FIGS. 7, 9, 10, 12, 13, 15, 17 and 18, in one or more examples, the forward slat revolute joint 122 (or the forward slat pivot axis A1) rotates about and/or relative to the aft slat revolute joint 124 when the slat 1230 moves between the retracted position and the extended position. Rotation of the forward slat revolute joint 122 about the aft slat revolute joint 124 during movement of the slat 1230 facilities desired movement of the slat 1230.

As illustrated in FIGS. 1, 7, 10 and 13, in one or more examples, the primary support 102 includes or takes the form of the four-bar linkage 110. In one or more examples, the four-bar linkage 110 includes the coupler link 112, a forward grounded link 114, and an aft grounded link 116. In these examples, the coupler link 112 serves as the primary support arm 150 of the primary support 102. The coupler link 112 is rotationally coupled or pivotally coupled to the slat 1230 at the forward slat revolute joint 122. The forward grounded link 114 is rotationally coupled or pivotally coupled to the coupler link 112. The aft grounded link 116 is rotationally coupled or pivotally coupled to the coupler link 112.

As illustrated in FIGS. 5-7, 10 and 13, in one or more examples, the four-bar linkage 110 is a double-rocker mechanism and the forward grounded link 114 and the aft grounded link 116 are rocker links. A first (e.g., upper) end of each one of the forward grounded link 114 and the aft grounded link 116 is rotationally coupled to the coupler link 112 at a revolute joint or other suitable rotational connection. A second (e.g., lower) end of each one of the forward grounded link 114 and the aft grounded link 116 is rotationally coupled to a ground link 118 (e.g., a set of ribs 1234 as shown in FIG. 6) at a revolute joint or other suitable rotational connection.

Examples of any of the revolute joints or rotational connections described in connection with the system 100 can include a pin connection, a hinge connection, or other suitable connection that enables rotational or pivotal motion of one component relative to another component about at least one axis that passes through both components.

As illustrated in FIGS. 1, 7, 10 and 13, in one or more examples, the four-bar linkage 110 also includes the ground link 118. The forward grounded link 114 is rotationally coupled or pivotally coupled to the ground link 118. The aft grounded link 116 is rotationally coupled or pivotally coupled to the ground link 118. In one or more examples, a portion of the frame 1224 of the wing 1220 (e.g., one or more of the ribs 1234) serves as the ground link 118. In these examples, as also illustrated in FIG. 6, the forward grounded link 114 is rotationally coupled or pivotally coupled to the frame 1224 (e.g., between the set of ribs 1234) of the wing 1220 and the aft grounded link 116 is rotationally coupled or pivotally coupled to the frame 1224 (e.g., between the set of ribs 1234) of the wing 1220.

As illustrated in FIGS. 7, 10 and 13, in one or more examples, the forward grounded link 114 is positioned forward of the aft grounded link 116. In one or more examples, one of the forward grounded link 114 and the aft grounded link 116 is longer than another one of the forward grounded link 114 and the aft grounded link 116. As an example, and as illustrated in FIGS. 7, 10 and 13, the forward grounded link 114 is longer than the aft grounded link 116. As another example (not illustrated), the aft grounded link 116 is longer than the forward grounded link 114.

As illustrated in FIGS. 1, 8, 11 and 14, in one or more examples, the auxiliary support 104 includes an auxiliary track 132 and an auxiliary support arm 134. The auxiliary support arm 134 is coupled to the slat 1230. The auxiliary support arm 134 is movably coupled to the auxiliary track 132.

For the purpose of the present disclosure, items being "movably coupled" to one another refers to a first item being coupled to the second item and the first item being movable relative to the second item.

As illustrated in FIGS. 1, 8, 11 and 14, in one or more examples, the auxiliary track 132 includes a slot 136. The auxiliary support arm 134 is coupled to the auxiliary track 132 and is movable along the slot 136. In one or more examples, a forward end of the slot 136 terminates prior to the leading edge 1222 of the wing 1220. In one or more examples, the slot 136 has a complex curvature that directs movement of the slat 1230. In one or more examples, the auxiliary track 132 enables the angle of the slat 1230 to be adjusted through the stroke of the auxiliary support arm 134 along the slot 136.

In one or more examples, the auxiliary support arm 134 is coupled to and fixed relative to the slat 1230 such that the auxiliary support arm 134 and the slat 1230 are effectively the same body. The auxiliary support arm 134 can be coupled to the slat 1230 using any suitable technique, such as mechanical fasteners, which prohibit relative between the coupled components.

As illustrated in FIGS. 1, 8, 11 and 14, in one or more examples, auxiliary support arm 134 includes an auxiliary roller 138. The auxiliary roller 138 moves along the slot 136. As an example, at least a portion of the auxiliary roller 138 is configured to fit in the slot 136 and move (e.g., slide) along the slot 136. Movement of the auxiliary roller 138 along the slot 136 directs the position of the slat 1230.

As illustrated in FIGS. 17-19, in one or more examples, the primary support 102 includes the primary track 142 and a guide 144. In these examples, the primary track 142 serves as the primary support arm 150 of the primary support 102. In one or more examples, the guide 144 is coupled to the frame 1224 of the wings 1220. As an example, the guide 144 is coupled to (e.g., between) a set of the ribs 1234 (e.g., FIG. 19). The primary track 142 is rotationally coupled to the slat 1230 at the forward slat revolute joint 122. The primary track 142 is movably (e.g., rotationally) coupled to the guide 144. In these examples, primary track 142 moves along guide 144 and the guide 144 constrains the path of motion of the primary track 142 when the slat 1230 moves between the retracted position (e.g., FIG. 17) and one or the extended positions (e.g., FIG. 18).

In one or more examples, the guide 144 includes a plurality of primary rollers 146. Each of the primary rollers 146 is coupled to the frame 1224 of the wings 1220, such as to a corresponding one of the ribs 1234. The primary track 142 is situated or is captured between associated pairs of the primary rollers 146 and moves along the primary rollers 146 relative to the frame 1224 when the slat 1230 moves between the retracted position (e.g., FIG. 17) and one or the extended positions (e.g., FIG. 18).

In one or more examples, the primary track 142 includes an elongated body that is curved along a longitudinal axis.

In these examples, the slat rotation axis is a fixed center of rotation of the primary track 142 (e.g., the primary support slat track). As the actuator 108 (not shown in FIGS. 17-19) moves the slat 1230 between a retracted position (FIG. 17) and extended position (FIG. 18), the primary track 142 rotates around the slat rotation axis in a circular motion and transmits loads thru the rollers 146. In these examples, the rollers 146 are fixed-position rollers and held by the frame 1224 of the wings 1220 (e.g., the ribs 1234).

Referring now to FIGS. 1 and 3-19, the following are examples of the wing 1220, according to the present disclosure. Examples of the wing 1220 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

As illustrated in FIGS. 1 and 4-19, in one or more examples, the wing 1220 of the aircraft 1200 includes the leading edge 1222 and the frame 1224. The wing 1220 includes the slat 1230 that is movable relative to the leading edge 1222. The wing 1220 includes the primary support 102. In one or more examples, the primary support 102 includes the four-bar linkage 110. In one or more examples, the primary support 102 includes the primary track 142. The primary support 102 (e.g., four-bar linkage 110 or primary track 142) is rotationally coupled to the slat 1230 at the forward slat revolute joint 122. The primary support 102 (e.g., four-bar linkage 110 or primary track 142) is rotational coupled to the frame 1224. The primary support 102 (e.g., four-bar linkage 110 or primary track 142) is configured for moving the slat 1230 between the retracted position (e.g., FIGS. 7-9 and 17) and one or more extended positions (e.g., FIGS. 10-15 and 18). The wing 1220 includes the auxiliary support 104. The auxiliary support 104 is coupled to the slat 1230. The auxiliary support 104 is configured for pivoting the slat 1230 about the forward slat revolute joint 122 when the slat 1230 moves between the retracted position and the one or more extended positions. The wing 1220 includes the actuator support 106. The actuator support 106 is coupled to the slat 1230. The wing 1220 includes the actuator 108. The actuator 108 is coupled to the actuator support 106 at the aft slat revolute joint 124. The actuator 108 is configured for driving the slat 1230 between the retracted position and the one or more extended positions.

In one or more examples of the wing 1220, the forward slat revolute joint 122 is positioned forward of the aft slat revolute joint 124. In one or more examples of the wing 1220, the forward slat revolute joint 122 is located in the slat 1230. At least a portion of the aft slat revolute joint 124 is located in the wing 1220 aft of the leading edge 1222 at least when the slat 1230 is in the retracted position. In some examples, a portion of the aft slat revolute joint 124 is located in the wing 1220 when the slat 1230 is in one or more of the extended positions.

In one or more examples of the wing 1220, the forward slat revolute joint 122 has the forward slat pivot axis A1. The forward slap pivot axis A1 passes through the slat 1230 and the four-bar linkage 110. In one or more examples, the aft slat revolute joint 124 is a uniaxial joint (e.g., has one axis of rotation). In one or more examples, the aft slat revolute joint 124 is a biaxial joint (e.g., has two axes of rotation), In one or more examples, the aft slat revolute joint 124 is a multiaxial joint (e.g., has three axes of rotation), such as a universal joint or a spherical joint.

In one or more examples of the wing 1220, the forward slat revolute joint 122 (e.g., the forward slat pivot axis A1) moves along the forward arcuate path P1 (e.g., FIGS. 7, 10 and 13) when the slat 1230 moves between the retracted position and the one or more extended positions. In one or more examples of the wing 1220, the aft slat revolute joint 124 moves along the aft arcuate path P2 (e.g., FIGS. 9, 12 and 15) when the slat 1230 moves between the retracted position and the one or more extended positions. As such, when the slat 1230 moves between the retracted position and the one or more extended positions, the slat 1230 also follows or moves along an arcuate path. In these examples, the forward slat revolute joint 122, the aft slat revolute joint 124, and/or the slat 1230 have an angular motion along a corresponding arcuate path relative to an instantaneous center of rotation corresponding to the structure (e.g., illustrated as axis A2 in FIG. 9).

In one or more examples of the wing 1220, the forward slat revolute joint 122 (e.g., the forward slat pivot axis A1) rotates about the aft slat revolute joint 124 when the slat 1230 moves between the retracted position and the one or more extended positions.

In one or more examples of the wing 1220, the four-bar linkage 110 includes the coupler link 112 (e.g., primary support arm 150), the forward grounded link 114, and the aft grounded link 116. In one or more examples, the four-bar linkage 110 also includes the ground link 118. In various examples, as illustrated, the ground link 118 includes or is formed by a portion of the frame 1224 of the wing 1220. The coupler link 112 is rotationally coupled to the slat 1230 at the forward slat revolute joint 122. The forward grounded link 114 rotationally coupled to the coupler link 112 and to the frame 1224. The aft grounded link 116 rotationally coupled to the coupler link 112 and to the frame 1224.

In one or more examples of the wing 1220, the forward grounded link 114 is positioned forward of the aft grounded link 116. In one or more examples of the wing 1220, the forward grounded link 114 is longer than the aft grounded link 116. In one or more examples of the wing 1220, the aft grounded link 116 is longer than the forward grounded link 114.

In one or more examples of the wing 1220, the auxiliary support 104 includes the auxiliary track 132 and the auxiliary support arm 134. The auxiliary track 132 is located in the wing 1220. The auxiliary track 132 is located aft of the leading edge 1222. The auxiliary support arm 134 is coupled to the slat 1230. The auxiliary support arm 134 is movably coupled to the auxiliary track 132.

In one or more examples, the primary track 142 includes the primary support arm 150 and the rollers 146. The rollers 146 are coupled to and fixed relative to the frame 1224 of the wings 1220. The primary support arm 150 is rotationally coupled to the slat 1230 at the forward slat revolute joint 122. The primary support arm 150 is constrained by and rotationally movable relative to the rollers 146.

As illustrated in FIG. 4, in one or more examples, the wing 1220 includes a plurality of primary supports 202 and a plurality of auxiliary supports 204. In one or more examples, the wing 1220 can include more than one actuator support 106 and/or more than one actuator 108.

Referring now to FIGS. 1 and 3-13, the following are examples of the aircraft 1200, according to the present disclosure. Examples of the aircraft 1200 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the aircraft 1200 includes a pair of wings 1220. Each wing 1220 includes the leading edge 1222, the frame 1224, and at least one instance of the slat 1230. The slat 1230 is movable relative to the leading edge 1222. The wing 1220 includes the primary support 102. The primary support 102 includes the four-bar linkage 110 or the primary track 142. The primary support 102 is rotationally coupled to the slat 1230 at the forward slat revolute joint 122. The primary support 102 is rotational coupled to the frame 1224. The primary support 102 is configured for moving the slat 1230 between the retracted position (e.g., FIGS. 7-9 and 17) and one or more extended positions (e.g., FIGS. 10-15 and 18). The wing 1220 includes the auxiliary support 104. The auxiliary support 104 is coupled to the slat 1230. The auxiliary support 104 is configured for pivoting the slat 1230 about the forward slat revolute joint 122 when the slat 1230 moves between the retracted position and the one or more extended positions. The wing 1220 includes the actuator support 106. The actuator support 106 is coupled to the slat 1230. The wing 1220 includes the actuator 108. The actuator 108 is coupled to the actuator support 106 at the aft slat revolute joint 124. The actuator 108 is configured for driving the slat 1230 between the retracted position and the one or more extended positions.

Figure 2:
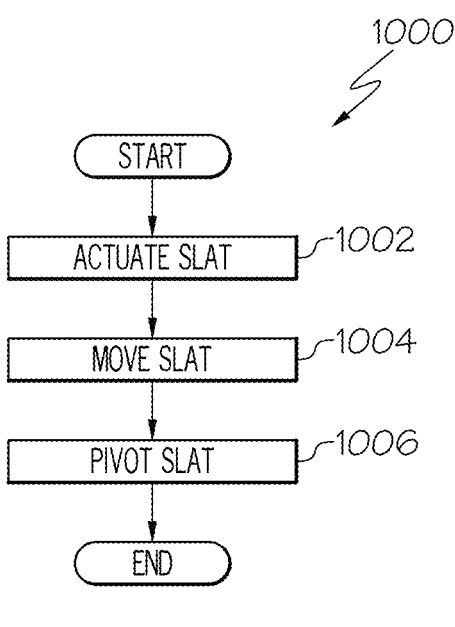
FIG. 2 is a flow diagram of an example of a method for driving a slat of an aircraft.

Referring now to FIG. 2, the following are examples of the method 1000, according to the present disclosure. In one or more examples, the method 1000 is implemented using the system 100 (FIG. 1). Examples of the method 1000 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

In one or more examples, the method 1000 includes a step of actuating 1002 the slat 1230 between the retracted position and one or more extended positions. Actuating the slat 1230 is performed by or using the actuator 108. The actuator 108 is coupled to the actuator support 106 of the slat 1230 at the aft slat revolute joint 124.

In one or more examples, the method 1000 includes a step of moving 1004 the slat 1230 relative to the leading edge 1222 of the wing 1220 between the retracted position and the one or more extended positions. Moving the slat 1230 is performed by or using the primary support 102. In one or more examples, the primary support 102 includes the four-bar linkage 110. In one or more examples, the primary support 102 includes the primary track 142. The primary support 102 (e.g., four-bar linkage 110 or primary track 142) is rotationally coupled to the slat 1230 at the forward slat revolute joint 122.

In one or more examples, the method 1000 includes a step of pivoting 1006 the slat 1230 about the forward slat revolute joint 122 when moving the slat 1230 between the retracted position and the one or more extended positions.

Pivoting the slat 1230 is performed by or using the auxiliary support 104. The auxiliary support 104 is coupled to the slat 1230.

In one or more examples, the method 1000, such as the step of moving 1004, includes a step of moving the forward slat revolute joint 122 (e.g., the forward slat pivot axis A1 passing through the forward slat revolute joint 122) along the forward arcuate path P1 when moving the slat 1230 between the retracted position and the one or more extended positions.

In one or more examples, the method 1000, such as the step of moving 1004, includes a step of moving the aft slat revolute joint 124 along the aft arcuate path P2 when moving the slat 1230 between the retracted position and the one or more extended positions.

In one or more examples, the method 1000, such as the step of moving 1004, includes a step of rotating the forward slat revolute joint 122 about (e.g., relative to) the aft slat revolute joint 124 when moving the slat 1230 between the retracted position and the one or more extended positions.

Figure 20:
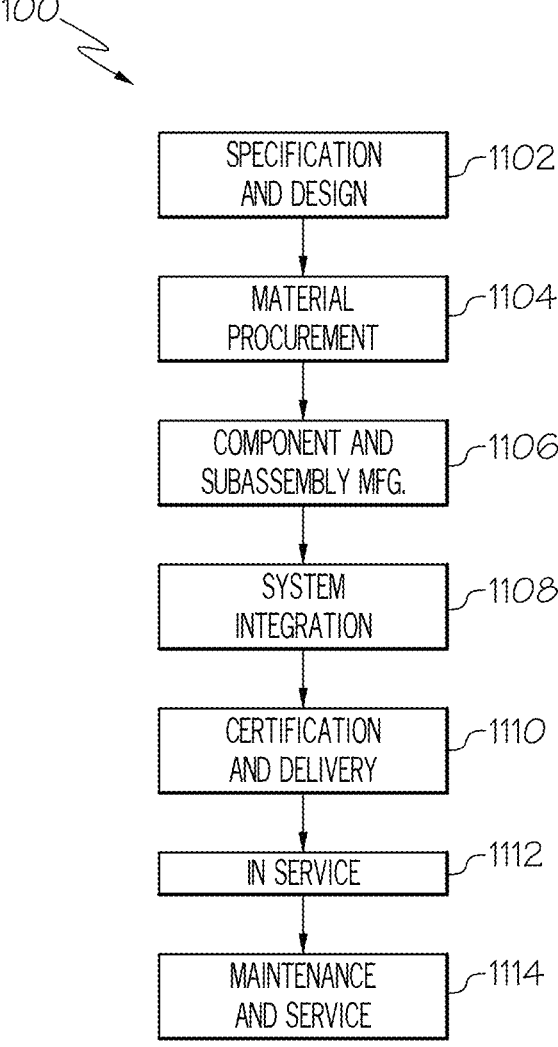
FIG. 20 is a flow diagram of an example of an aircraft manufacturing and service method.

Referring to FIGS. 3 and 20, examples of the system 100 and the method 1000, described herein, may be related to, or used in the context of, the aerospace manufacturing and service method 1100, as shown in the flow diagram of FIG. 16 and the aircraft 1200, as schematically illustrated in FIG. 3.

As illustrated in FIG. 3, in various examples, the aircraft 1200 can be any aerospace vehicle or platform that includes or otherwise utilizes slats as a control surface. In one or more examples, the aircraft 1200 includes an airframe 1202 having an interior 1206. The aircraft 1200 also includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control surfaces (e.g., slat 1230) coupled to the airframe 1202 of the aircraft 1200. In yet other examples, the onboard systems 1204 also include one or more other systems 1216, such as, but not limited to, communications systems, avionics systems, software distribution systems, network communications systems, passenger information/entertainment systems, guidance systems, radar systems, weapons systems, and the like.

As illustrated in FIG. 20, during pre-production of the aircraft 1200, the manufacturing and service method 1100 includes specification and design 1102 of the aircraft 1200 and material procurement 1104. During production of the aircraft 1200, component and subassembly manufacturing 1106 and system integration 1108 of the aircraft 1200 take place. Thereafter, the aircraft 1200 goes through certification and delivery 1110 to be placed in service 1112. Routine maintenance and service 1114 includes modification, reconfiguration, refurbishment, etc. of one or more systems of the aircraft 1200.

Each of the processes of the manufacturing and service method 1100 illustrated in FIG. 20 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000, shown and described herein, may be employed during any one or more of the stages of the manufacturing and service method 1100 shown in the flow diagram illustrated by FIG. 20. In an example, the slats 1230 of the wing 1220 of the aircraft 1200 can be installed, controlled, and driven using the system 100 and/or according to the method 1000 during a portion of component and subassembly manufacturing 1106 and/or system integration 1108. Further, the slats 1230 of the wing 1220 can be installed, controlled, and driven using the system 100 and/or according to the method 1000 while the aircraft 1200 is in service 1112. Also, the slats 1230 of the wing 1220 of the aircraft 1200 can be installed, controlled, and driven using the system 100 and/or according to the method 1000 during system integration 1108 and certification and delivery 1110. Similarly, the slats 1230 of the wing 1220 can be installed, controlled, and driven using the system 100 and/or according to the method 1000 while the aircraft 1200 is in service 1112 and during maintenance and service 1114.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 3-19, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-19, referred to above, need be included in every example and not all elements, features, and/or components described herein are necessarily depicted in each illustrative example. Accordingly, some of the elements, features, and/or components described and illustrated in FIGS. 1, 3-19 may be combined in various ways without the need to include other features described and illustrated in FIGS. 1, 3-19, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-19, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-19, and such elements, features, and/or components may not be discussed in detail herein with reference to each of FIGS. 1, 3-19. Similarly, all elements, features, and/or components may not be labeled in each of FIGS. 1, 3-19, but reference numerals associated therewith may be utilized herein for consistency.

In FIGS. 2 and 20, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 20 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the wing 1220, the aircraft 1200, and the method 1000 have been shown and described, modifications may occur to those skilled in the art upon reading the specification. The present application includes such modifications and is limited only by the scope of the claims.

What is claimed is:

1. A system for driving a slat of a wing of an aircraft, the system comprising:
a primary support configured to be rotationally coupled to the slat at a forward slat revolute joint for moving the slat between a retracted position and one or more extended positions;

an auxiliary support coupled to the slat for pivoting the slat about the forward slat revolute joint when the slat moves between the retracted position and the one or more extended positions; and an actuator support configured to be coupled to the slat; and an actuator coupled to the actuator support at an aft slat revolute joint for driving the slat between the retracted position and the one or more extended positions, wherein the forward slat revolute joint is positioned forward of the aft slat revolute joint.

2. The system of claim 1, wherein:

the forward slat revolute joint is located in the slat; and the aft slat revolute joint is located in the wing when the slat is in the retracted position.

3. The system of claim 1, wherein:

the forward slat revolute joint has a forward slat pivot axis that passes through the slat and primary support; and the forward slat pivot axis is positioned forward of aft slat revolute joint.

4. The system of claim 3, wherein the forward slat revolute joint rotates about the aft slat revolute joint when the slat moves between the retracted position and the one or more extended positions.

5. The system of claim 1, wherein:

the forward slat revolute joint moves along a forward arcuate path when the slat moves between the retracted position and the one or more extended positions; and the aft slat revolute joint moves along an aft arcuate path when the slat moves between the retracted position and the one or more extended positions.

6. The system of claim 1, wherein the primary support comprises a four-bar linkage, comprising:

a coupler link configured to be rotationally coupled to the slat at the forward slat revolute joint;

a forward grounded link rotationally coupled to the coupler link and configured to be coupled to a frame of the wing; and an aft grounded link rotationally coupled to the coupler link and configured to be coupled to the frame of the wing.

7. The system of claim 6, wherein one of the forward grounded link and the aft grounded link is longer than another one of the forward grounded link and the aft grounded link.

8. The system of claim 1, wherein the primary support comprises:

a guide coupled to a frame of the wing; and a primary track rotationally coupled to the slat at the forward slat revolute joint and movably coupled to the guide.

9. The system of claim 8, wherein:

the guide comprises a plurality of primary rollers coupled to the frame of the wing; and the primary track moves along the plurality of primary rollers relative to the frame.

10. The system of claim 1, wherein the auxiliary support comprises:

an auxiliary track; and an auxiliary support arm coupled to the slat and movably coupled to the auxiliary track.

11. The system of claim 10, wherein:

the auxiliary track comprises a slot; and the auxiliary support arm comprises an auxiliary roller that moves along the slot.

12. A wing of an aircraft comprising:

a leading edge;

a frame;

a slat movable relative to the leading edge;

a primary support rotationally coupled to the slat at a forward slat revolute joint and rotationally coupled to the frame for moving the slat between a retracted position and one or more extended positions;

an auxiliary support coupled to the slat for pivoting the slat about the forward slat revolute joint when the slat moves between the retracted position and the one or more extended positions;

an actuator support coupled to the slat; and an actuator coupled to the actuator support at an aft slat revolute joint for driving the slat between the retracted position and the one or more extended positions, wherein the forward slat revolute joint is positioned forward of the aft slat revolute joint.

13. The wing of claim 12, wherein:

the forward slat revolute joint is located in the slat; and the aft slat revolute joint is located in the wing aft of the leading edge when the slat is in the retracted position.

14. The wing of claim 13, wherein:

the forward slat revolute joint has a forward slat pivot axis that passes through the slat and the primary support; and the forward slat revolute joint moves along a forward arcuate path when the slat moves between the retracted position and the one or more extended positions.

15. The wing of claim 14, wherein:

the aft slat revolute joint moves along an aft arcuate path when the slat moves between the retracted position and the one or more extended positions; and the forward slat revolute joint rotates about the aft slat revolute joint when the slat moves between the retracted position and the one or more extended positions.

16. The wing of claim 12, wherein:

the primary support comprises a four-bar linkage, comprising:

a coupler link rotationally coupled to the slat at the forward slat revolute joint;

a forward grounded link rotationally coupled to the coupler link and to the frame; and an aft grounded link rotationally coupled to the coupler link and to the frame.

17. The wing of claim 12, wherein the primary support comprises:

a plurality of primary rollers coupled to the frame of the wing; and a primary track rotationally coupled to the slat at the forward slat revolute joint and movably coupled to the plurality of primary rollers.

18. The wing of claim 12, wherein the auxiliary support comprises:

an auxiliary track located in the wing aft of the leading edge; and an auxiliary support arm coupled to the slat and movably coupled to the auxiliary track.

19. A method for driving a slat of a wing of an aircraft, the method comprising:

actuating the slat between a retracted position and one or more extended positions using an actuator coupled to an actuator support at an aft slat revolute joint;

moving the slat relative to a leading edge of the wing between the retracted position and the one or more extended positions using a primary support rotationally coupled to the slat at a forward slat revolute joint; and pivoting the slat about the forward slat revolute joint using an auxiliary support coupled to the slat when moving the slat between the retracted position and the one or more extended positions, wherein the forward slat revolute joint is positioned forward of the aft slat revolute joint.

20. The method of claim 19, further comprising:

moving the forward slat revolute joint along a forward arcuate path when moving the slat between the retracted position and the one or more extended positions;

moving the aft slat revolute joint along an aft arcuate path when moving the slat between the retracted position and the one or more extended positions; and rotating the forward slat revolute joint about the aft slat revolute joint when moving the slat between the retracted position and the one or more extended positions.

\* \* \* \* \*